US012785769B2

(12) United States Patent
Huang et al.

(10) Patent No.: US 12,785,769 B2
(45) Date of Patent: Nov. 3, 2026

(54) CODEBOOK DESIGN AND FEEDBACK FOR CIRCULAR ANTENNA ARRAY BEAMFORMING

(71) Applicant: QUALCOMM Incorporated, San Diego, CA (US)

(72) Inventors: Min Huang, Beijing (CN); Chao Wei, Beijing (CN); Hao Xu, Beijing (CN); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 284 days.

(21) Appl. No.: 18/684,603

(22) PCT Filed: Sep. 23, 2021

(86) PCT No.: PCT/CN2021/119794
§ 371 (c)(1),
(2) Date: Feb. 16, 2024

(87) PCT Pub. No.: WO2023/044644
PCT Pub. Date: Mar. 30, 2023

(65) Prior Publication Data
US 2024/0356599 A1 Oct. 24, 2024

(51) Int. Cl.
*H04B 7/06* (2006.01)
*H04B 7/0456* (2017.01)

(52) U.S. Cl.
CPC ......... *H04B 7/0617* (2013.01); *H04B 7/0478* (2013.01); *H04B 7/0634* (2013.01)

(58) Field of Classification Search
CPC .. H04B 7/0617; H04B 7/0478; H04B 7/0634; H04B 7/0639; H04B 7/10; H04B 7/0469
See application file for complete search history.

(56) References Cited

U.S. PATENT DOCUMENTS

| | | | | |
|---|---|---|---|---|
| 12,205,581 | B2 | 1/2025 | Biswas | |
| 12,506,581 | B2 * | 12/2025 | Huang | H04B 7/0639 |
| 2014/0064401 | A1 | 3/2014 | Wu et al. | |

(Continued)

FOREIGN PATENT DOCUMENTS

| | | | |
|---|---|---|---|
| CN | 103782523 | A | 5/2014 |
| WO | WO-2020164153 | A1 | 8/2020 |

OTHER PUBLICATIONS

International Search Report and Written Opinion—PCT/CN2021/119794—ISA/EPO—Jun. 22, 2022 (2105897WO1).

(Continued)

*Primary Examiner* — Shawn D Miller
(74) *Attorney, Agent, or Firm* — Holland & Hart LLP

(57) ABSTRACT

Methods, systems, and devices for wireless communications are described for closed-loop precoding for multiple-input multiple-output for transmitter circle arrays, for example uniform circular array panels. In some aspects, a base station including a transmitter circle array may steer a beam to a user equipment (UE) using codebooks, quantization rules, and feedback from the user equipment. In some aspects, the same transmitter circle array may be used for both backhaul communications with a device at a fixed location, for example using beams formed via discrete Fourier transform (DFT) vectors, and access communications with a UE via non-DFT beams coded using closed-loop precoding.

20 Claims, 21 Drawing Sheets

(56) References Cited

U.S. PATENT DOCUMENTS

| | | | | |
|---|---|---|---|---|
| 2017/0019159 | A1* | 1/2017 | Vook .................... | H04B 7/0469 |
| 2019/0036573 | A1* | 1/2019 | Park ..................... | H04B 7/0417 |
| 2019/0044589 | A1 | 2/2019 | Park et al. | |

OTHER PUBLICATIONS

ZTE: "Multi Granular Feedback Design for LTE-A", 3GPP TSG-RAN WG1 #60bis, R1-101837, Apr. 16, 2010 (Apr. 16, 2010), 11 Pages, The Whole Document.

* cited by examiner

CODEBOOK DESIGN AND FEEDBACK FOR CIRCULAR ANTENNA ARRAY BEAMFORMING

CROSS REFERENCE

The present Application is a 371 national stage filing of International PCT Application No. PCT/CN2021/119794 by HUANG et al. entitled "CODEBOOK DESIGN AND FEEDBACK FOR CIRCULAR ANTENNA ARRAY BEAMFORMING," filed Sep. 23, 2021, which is assigned to the assignee hereof, and which is expressly incorporated by reference in its entirety herein.

FIELD OF TECHNOLOGY

The following relates to wireless communications, including codebook design and feedback for circular antenna array beamforming.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Orbital Angular Momentum (OAM) communications may be supported by some wireless communications systems through the use of antenna panels. Some antenna panels, however, may be limited in terms of beam steering when performing beamformed communications, which may lead to reduced signal strength received at target devices or lost communications, among other issues.

SUMMARY

The described techniques relate to improved methods, systems, devices, and apparatuses that support codebook design and feedback for circular antenna array beamforming. Generally, the described techniques provide for codebooks, quantization rules, and signaling procedures which may be used by a transmitter circle array (e.g., a uniform circular array (UCA) panel) to use non-discrete Fourier transform (DFT) vectors to steer beams to a user equipment (UE). For example, in some implementations, a base station having a transmitter circle array may transmit, to a UE, a message that indicates a codebook type associated with a transmitter circle array of the base station and that indicates parameters associated with the codebook type. The base station may transmit reference signals from each antenna element of the transmitter circle array and the UE may generate one or more codewords associated with the transmitter circle array based on the codebook type, the parameters, and the received reference signals. In some cases, the UE may transmit a report, such as a feedback report, that indicates the generated codeword(s) to the base station.

A method for wireless communications at a user equipment (UE) is described. The method may include receiving, from a base station, a message that indicates a codebook type associated with a transmitter circle array of the base station and that indicates a set of multiple parameters associated with the codebook type, receiving, from the base station, a set of multiple reference signals via one or more antenna elements of the transmitter circle array, generating one or more codewords associated with the transmitter circle array based on the message and the set of multiple reference signals, and transmitting a report indicating the one or more codewords to the base station.

An apparatus for wireless communications at a UE is described. The apparatus may include a processor, memory coupled with the processor, and instructions stored in the memory. The instructions may be executable by the processor to cause the apparatus to receive, from a base station, a message that indicates a codebook type associated with a transmitter circle array of the base station and that indicates a set of multiple parameters associated with the codebook type, receive, from the base station, a set of multiple reference signals via one or more antenna elements of the transmitter circle array, generate one or more codewords associated with the transmitter circle array based on the message and the set of multiple reference signals, and transmit a report indicating the one or more codewords to the base station.

Another apparatus for wireless communications at a UE is described. The apparatus may include means for receiving, from a base station, a message that indicates a codebook type associated with a transmitter circle array of the base station and that indicates a set of multiple parameters associated with the codebook type, means for receiving, from the base station, a set of multiple reference signals via one or more antenna elements of the transmitter circle array, means for generating one or more codewords associated with the transmitter circle array based on the message and the set of multiple reference signals, and means for transmitting a report indicating the one or more codewords to the base station.

A non-transitory computer-readable medium storing code for wireless communications at a UE is described. The code may include instructions executable by a processor to receive, from a base station, a message that indicates a codebook type associated with a transmitter circle array of the base station and that indicates a set of multiple parameters associated with the codebook type, receive, from the base station, a set of multiple reference signals via one or more antenna elements of the transmitter circle array, generate one or more codewords associated with the transmitter circle array based on the message and the set of multiple reference signals, and transmit a report indicating the one or more codewords to the base station.

In some examples of the method, apparatuses, and non-transitory computer-readable medium described herein, generating the one or more codewords may include operations, features, means, or instructions for generating the one or more codewords of the codebook type based on the set of multiple parameters, where the set of multiple parameters associated with the codebook type includes a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

In some examples of the method, apparatuses, and non-transitory computer-readable medium described herein, generating the one or more codewords may include operations, features, means, or instructions for generating a set of multiple precoding vectors based on a first angle between a direction of the UE and a direction of the boresight of the transmitter circle array and based on a second angle between a projection of direction of the UE on a plane of the transmitter circle array and a direction of a coordinate axis in the plane of the transmitter circle array.

In some examples of the method, apparatuses, and non-transitory computer-readable medium described herein, generating the one or more codewords may include operations, features, means, or instructions for generating a first codeword associated with a first polarization based on a set of precoding weights associated with both the first polarization and a second polarization and generating a second codeword associated with the second polarization based on the set of precoding weights.

In some examples of the method, apparatuses, and non-transitory computer-readable medium described herein, generating the one or more codewords may include operations, features, means, or instructions for generating a set of precoding vectors based on the number of layers, where the set of precoding vectors includes precoding vectors that may be independent of each other.

In some examples of the method, apparatuses, and non-transitory computer-readable medium described herein, generating the one or more codewords may include operations, features, means, or instructions for generating a set of precoding vectors based on the number of layers, where the set of precoding vectors includes at least one precoding vector that may be dependent on another precoding vector of the set of precoding vectors.

In some examples of the method, apparatuses, and non-transitory computer-readable medium described herein, generating the one or more codewords may include operations, features, means, or instructions for generating a first codeword associated with a first layer and a first polarization and generating a second codeword associated with a second layer and a second polarization.

In some examples of the method, apparatuses, and non-transitory computer-readable medium described herein, the first layer, the second layer, the first polarization, and the second polarization may be associated with common basis direction vectors.

In some examples of the method, apparatuses, and non-transitory computer-readable medium described herein, the first and second layers may be associated with common basis direction vectors and the first and second polarizations may be associated with different basis direction vectors.

In some examples of the method, apparatuses, and non-transitory computer-readable medium described herein, the first and second layers may be associated with different basis direction vectors and the first and second polarizations may be associated with common basis direction vectors.

In some examples of the method, apparatuses, and non-transitory computer-readable medium described herein, the first layer, the second layer, the first polarization, and the second polarization may be associated with different basis direction vectors.

In some examples of the method, apparatuses, and non-transitory computer-readable medium described herein, a codeword of the one or more codewords may be associated with a weighted sum of basis direction vectors used for generating the codeword.

Some examples of the method, apparatuses, and non-transitory computer-readable medium described herein may further include operations, features, means, or instructions for generating the report including a first set of codewords associated with a wideband channel.

Some examples of the method, apparatuses, and non-transitory computer-readable medium described herein may further include operations, features, means, or instructions for generating the report including a first set of codewords associated with a first subband and a second set of codewords associated with a second subband.

In some examples of the method, apparatuses, and non-transitory computer-readable medium described herein, generating the one or more codewords may include operations, features, means, or instructions for generating respective sets of one or more codewords for each transmitter circle of the transmitter circle array.

In some examples of the method, apparatuses, and non-transitory computer-readable medium described herein, the report includes a set of quantization bits indicative of a precoding matrix indicator associated with the one or more codewords.

A method for wireless communication at a base station is described. The method may include transmitting, to a UE, a message that indicates a codebook type associated with a transmitter circle array of the base station and that indicates a set of multiple parameters associated with the codebook type, transmitting, to the UE, a set of multiple reference signals via one or more antenna elements of the transmitter circle array, receiving, from the UE, a report indicating one or more codewords associated with the transmitter circle array based on the set of multiple reference signals, the codebook type, and the set of multiple parameters, and transmitting, to the UE, a downlink data message using one or more transmitter circles of the transmitter circle array based on the report.

An apparatus for wireless communication at a base station is described. The apparatus may include a processor, memory coupled with the processor, and instructions stored in the memory. The instructions may be executable by the processor to cause the apparatus to transmit, to a UE, a message that indicates a codebook type associated with a transmitter circle array of the base station and that indicates a set of multiple parameters associated with the codebook type, transmit, to the UE, a set of multiple reference signals via one or more antenna elements of the transmitter circle array, receive, from the UE, a report indicating one or more codewords associated with the transmitter circle array based on the set of multiple reference signals, the codebook type, and the set of multiple parameters, and transmit, to the UE, a downlink data message using one or more transmitter circles of the transmitter circle array based on the report.

Another apparatus for wireless communication at a base station is described. The apparatus may include means for transmitting, to a UE, a message that indicates a codebook type associated with a transmitter circle array of the base station and that indicates a set of multiple parameters associated with the codebook type, means for transmitting, to the UE, a set of multiple reference signals via one or more antenna elements of the transmitter circle array, means for receiving, from the UE, a report indicating one or more codewords associated with the transmitter circle array based on the set of multiple reference signals, the codebook type, and the set of multiple parameters, and means for transmitting, to the UE, a downlink data message using one or more transmitter circles of the transmitter circle array based on the report.

A non-transitory computer-readable medium storing code for wireless communication at a base station is described. The code may include instructions executable by a processor to transmit, to a UE, a message that indicates a codebook type associated with a transmitter circle array of the base station and that indicates a set of multiple parameters associated with the codebook type, transmit, to the UE, a set of multiple reference signals via one or more antenna elements of the transmitter circle array, receive, from the UE, a report indicating one or more codewords associated with the transmitter circle array based on the set of multiple reference signals, the codebook type, and the set of multiple parameters, and transmit, to the UE, a downlink data message using one or more transmitter circles of the transmitter circle array based on the report.

In some examples of the method, apparatuses, and non-transitory computer-readable medium described herein, the set of multiple parameters associated with the codebook type includes a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

In some examples of the method, apparatuses, and non-transitory computer-readable medium described herein, the one or more codewords may be associated with a set of multiple precoding vectors, the set of multiple precoding vectors based on a first angle between a direction of the UE and a direction of the boresight of the transmitter circle array and based on a second angle between a projection of direction of the UE on a plane of the transmitter circle array and a direction of a coordinate axis in the plane of the transmitter circle array.

In some examples of the method, apparatuses, and non-transitory computer-readable medium described herein, receiving the report may include operations, features, means, or instructions for receiving the report including a first codeword associated with a first polarization that may be based on a set of precoding weights associated with both the first polarization and a second polarization, where the report includes a second codeword associated with the second polarization and the set of precoding weights.

In some examples of the method, apparatuses, and non-transitory computer-readable medium described herein, the codebook type may be a multi-layer codebook and the set of multiple parameters includes a number of layers and the one or more codewords may be based on a set of precoding vectors and the number of layers, where the set of precoding vectors includes precoding vectors that may be independent of each other.

In some examples of the method, apparatuses, and non-transitory computer-readable medium described herein, a codeword of the one or more codewords may be associated with a weighted sum of the basis direction vectors.

In some examples of the method, apparatuses, and non-transitory computer-readable medium described herein, the report indicates a first codeword associated with a first layer and a first polarization and the report indicates a second codeword associated with a second layer and a second polarization.

In some examples of the method, apparatuses, and non-transitory computer-readable medium described herein, the first layer, the second layer, the first polarization, and the second polarization may be associated with common basis direction vectors.

In some examples of the method, apparatuses, and non-transitory computer-readable medium described herein, the first and second layers may be associated with common basis direction vectors and the first and second polarizations may be associated with different basis direction vectors.

In some examples of the method, apparatuses, and non-transitory computer-readable medium described herein, the first and second layers may be associated with different basis direction vectors and the first and second polarizations may be associated with common basis direction vectors.

In some examples of the method, apparatuses, and non-transitory computer-readable medium described herein, the first layer, the second layer, the first polarization, and the second polarization may be associated with different basis direction vectors.

In some examples of the method, apparatuses, and non-transitory computer-readable medium described herein, the report includes a first set of codewords associated with a wideband channel.

In some examples of the method, apparatuses, and non-transitory computer-readable medium described herein, the report includes a first set of codewords associated with a first subband and a second set of codewords associated with a second subband.

In some examples of the method, apparatuses, and non-transitory computer-readable medium described herein, the report includes respective sets of one or more codewords for each transmitter circle of the transmitter circle array based on the set of multiple reference signals.

In some examples of the method, apparatuses, and non-transitory computer-readable medium described herein, the report includes a set of quantization bits indicative of a precoding matrix indicator associated with the one or more codewords.

DETAILED DESCRIPTION

Figure 1:
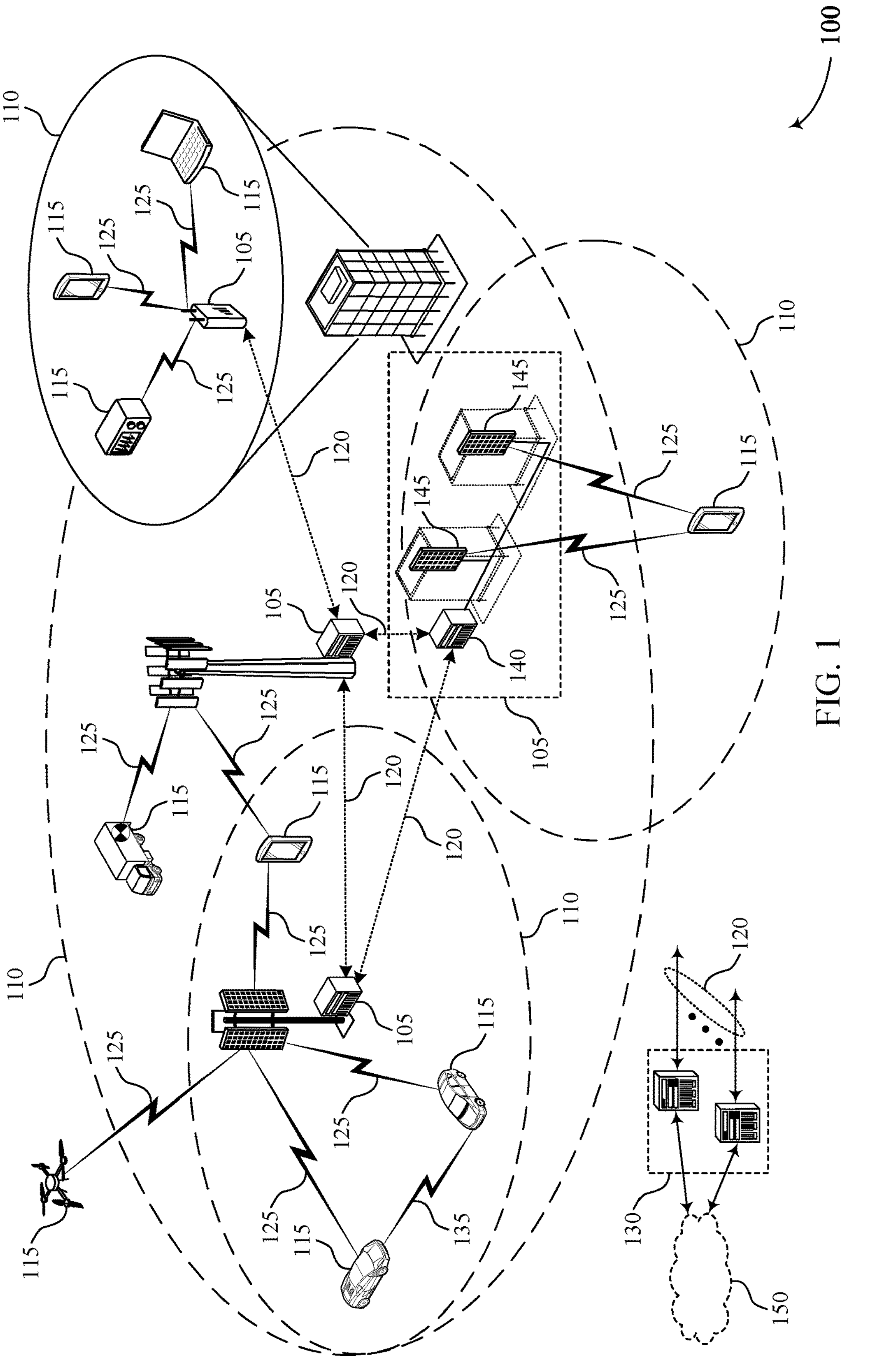
FIGS. 1 and 2 illustrate examples of a wireless communications system that supports codebook design and feedback for circular antenna array beamforming in accordance with aspects of the present disclosure.

In some wireless communications systems, wireless devices, such as base stations or user equipments (UEs), or both, may communicate directionally, for example, using beams to orient communication signals over one or more directions. In some systems, such as in orbital angular momentum (OAM)-capable communications systems, the wireless devices may communicate using OAM beams, which, in addition to providing signal directionality, may also provide additional dimensions for signal multiplexing. In some aspects, for example, such additional dimensions may include an OAM state, a polarization, or both, where OAM beams with different OAM states, polarizations, or both may be orthogonal to each other. As such, OAM beams with different OAM states or polarizations may be multiplexed together to increase the capacity of an OAM link. In some cases, a wireless device may use spiral phase plate (SPP) or uniform circular array (UCA)-based techniques to generate OAM beams.

In some cases, a transmitting device and a receiving device may each be equipped with one or more antenna circles (e.g., UCAs). The one or more antenna circles may include a center antenna circle and one or more coaxial peripheral antenna circles that enable the transmitting device and the receiving device to communicate. A UCA panel may be divided into two parts, an outer section with antenna circles having larger radii, which may support OAM communications, and an inner section with antenna circles having smaller radii which may not support OAM communications. The antenna circles in the inner section may have different numbers of antenna elements in each circle.

Conventional multiple-input multiple-output (MIMO) codebooks used in channel state information (CSI) feedback are based on discrete Fourier transform (DFT) vectors. In a conventional MIMO codebook, the codebook for UE feedback is composed of DFT vectors. Conventional closed-loop MIMO codebooks may use uniform liner array (ULA) or uniform planar array (UPA) panels. With ULA or UPA panels, each DFT vector may steer a beam in a certain direction. Thus, with ULA or UPA panels, the base station may use DFT beams to concentrate the transmit power on the direction of the UE position. With a UCA panel, however, DFT vectors generate OAM beams around the boresight (e.g., in the direction perpendicular to the panel direction). Accordingly, DFT OAM beams are generally used for backhaul and/or fronthaul communications between fixed locations (e.g., between static network nodes). However, DFT OAM beams are generally not used to steer beams to a UE, which may have a changing (and arbitrary, non-boresight) location, for access communications.

The present disclosure relates to codebooks, quantization rules, and signaling procedures which may enable a transmitter circle array (e.g., a UCA) panel to use non-DFT vectors to steer beams to UEs. Example schemes for closed-loop precoding/MIMO for transmitter circle arrays may improve beamforming gain and throughput of transmitter circle array access link(s). In some examples, the same transmitter circle array may be used for both backhaul communication (e.g., with another network device at a fixed location) and access communications with a UE. In some cases, a base station may transmit a configuration message to a UE which configures a codebook type associated with the transmitter circle array and the parameters of a transmitter circle array codebook. An example codebook type is a type-1 codebook for UCA with 1 layer. where the codebook parameters include UCA circle radius r, number of elements in UCA circle N, wavelength λ, oversampling factors $O_1$ and $O_2$, and inter-polarization coefficient set size N'. If the access communications include multiple layers, the codebook parameters may also include the number of layers. Precoding vectors for the layers may be correlated or uncorrelated. Another example codebook type is a type-2 codebook for UCA, which may be used for single or multi-layer applications. A type-2 codebook may include several options that relate to different directional vectors used to generate codewords, along with additional parameters including the number of layers L and combination group size K. A type-2 codebook may be associated with more accuracy and more overhead as compared with a type-1 codebook.

After indicating a transmitter circle array codebook type and the parameters of the transmitter circle array codebook, the base station may transmit reference signals from each antenna element of the UCA. The UE may receive one or more of the reference signals from the base station and estimate a channel response matrix, select codewords for the codebook indicated by the base station, and transmit a report to the base station indicating the one or more codewords. The base station may steer beams to the UE for access communications using the one or more codewords reported by the UE. In some cases, the UE may report a pre-coding matrix indicator (PMI) and a number of quantization bits of the PMI to the base station. In some examples, for transmitter circle array with multiple antenna circles, the base station may also indicate to the UE: 1) the number of antenna circles, 2) the radius, the number of antennas, and the codebook parameters for each circle, and 3) an inter-circle coefficient set size N". The UE may estimate the channel response values, select the codewords for the UCA-based codebook, and indicate the codewords to the base station for each antenna circle.

Aspects of the disclosure are initially described in the context of wireless communications systems. Aspects of the disclosure are also described in the context of a system diagram, an SPP configuration, a UCA-based configuration, a multi-circle transmitter circle array configuration, and a process flow. Aspects of the disclosure are further illustrated by and described with reference to apparatus diagrams, system diagrams, and flowcharts that relate to codebook design and feedback for circular antenna array beamforming.

FIG. 1 illustrates an example of a wireless communications system 100 that supports codebook design and feedback for circular antenna array beamforming in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1. In some examples, a UE 115 may be an example of an IAB node and may be capable of access and backhaul communications. For example, a UE 115 may be capable of relaying communications from an access device (e.g., an end device UE 115) to another network device (e.g., a base station 105).

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a ULE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max}\neq N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, MIMO communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a PMI or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some wireless communications systems, such as the wireless communications system 100, a base station 105 may be equipped with one or antenna circles (e.g., UCAs) that may enable the base station 105 to communicate with another device (e.g., another base station 105, an IAB node, a relay node) according to one or more OAM modes. The base station 105 may communicate with a UE 115 via the one or more antenna circles via beams steered according to a non-DFT codebook. The non-DFT codebook may be pre-coded based on feedback from the UE 115. For example, the base station 105 may transmit a message (e.g., a configuration message) to a UE 115, which configures a codebook type associated with the transmitter circle array (e.g., a UCA) of the base station 105 and the parameters of the transmitter circle array codebook. After indicating a codebook type and the parameters of the transmitter circle array codebook, the base station 105 may transmit reference signals from each antenna element of the transmitter circle array to the UE 115. Based on the received reference signals, the UE 115 may estimate a channel response matrix based on the reference signals and select codewords for the transmitter circle array codebook type indicated by the base station 105 based on the channel response matrix. The UE 115 may transmit a report to the base station 105 indicating the one or more codewords. The base station 105 may steer beams to the UE 115 for access communications (e.g., downlink communications) using the one or more codewords reported by the UE 115. A base station 105 may use the same transmitter circle array for both backhaul communications via OAM beams with another device having a transmitter circle array and access communications with a UE 115 via beams steered via a non-DFT codebook.

Figure 2:
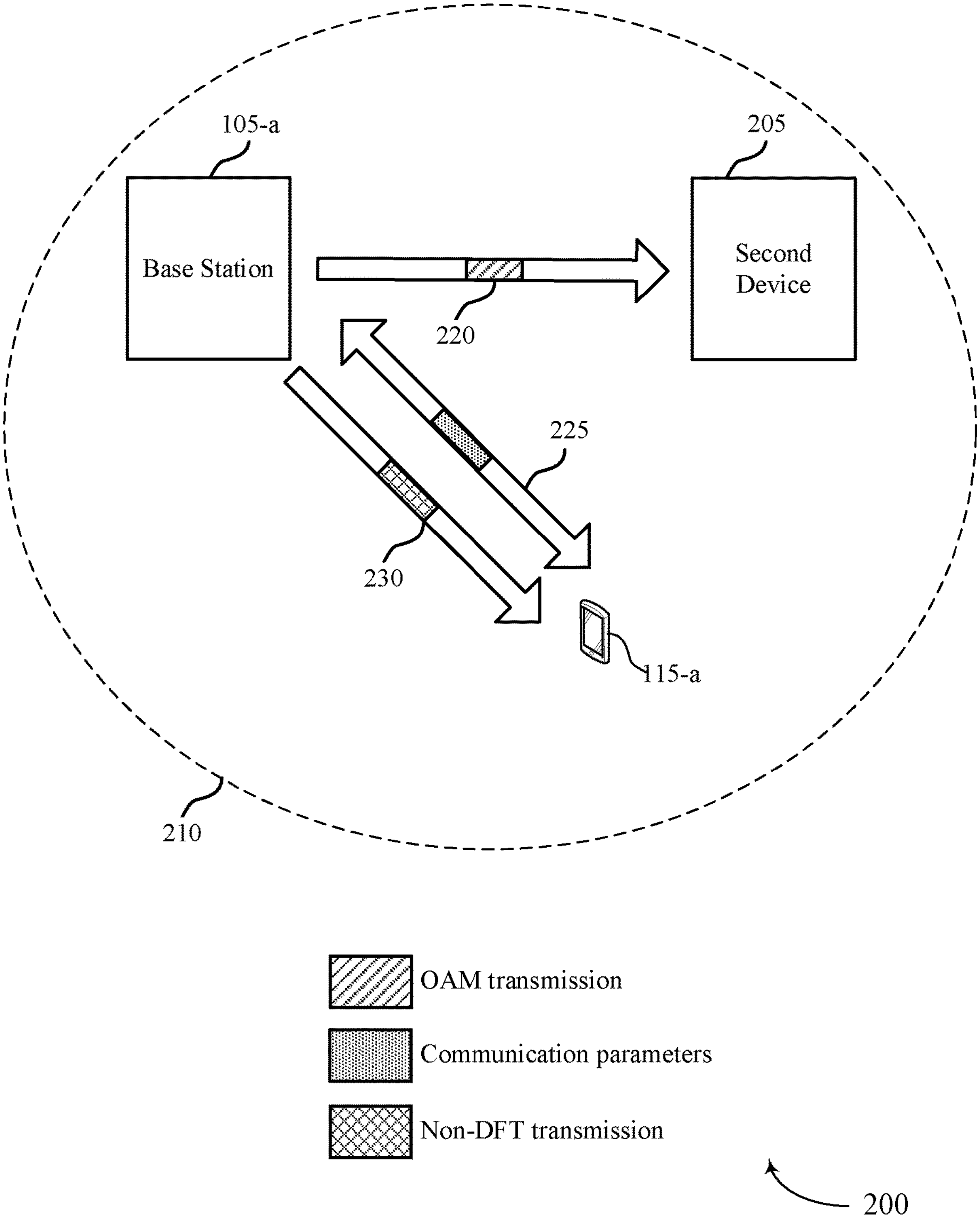

FIG. 2 illustrates an example of a wireless communications system 200 that supports codebook design and feedback for circular antenna array beamforming in accordance with aspects of the present disclosure. In some examples, wireless communications system 200 may implement aspects of wireless communications system 100. The wireless communications system 200 may illustrate communications between a base station 105-*a* and a second device 205, where the second device 205 may another base station, a UE 115 as described herein, an IAB node, or a relay node, among other devices. In some cases, the base station 105-*a* may serve a geographic coverage area 210. In some examples, the wireless communications system 200 (which may be an example of a sixth generation (6G) system, a 5G system, or another generation system) may support OAM-based communications and, as such, the base station 105-*a* and the second device 205 may transmit or receive OAM beams, or OAM-related signals over backhaul communication link 220 within the geographic coverage area 210. For example, one or both of the base station 105-*a* and the second device 205 may be equipped with a transmitter circle array (e.g., UCAs) which may generate OAM beams using DFT based codebooks.

OAM-based communication may be associated with a line-of-sight transmission scheme for high spatial multiplexing with low complexity. From the transmitter (e.g., base station 105-*a*) to the receiver (e.g., second device 205) OAM signals include multiple coaxially propagating and spatially-overlapping electromagnetic waves, with each wave carrying a data stream. The wavefront of an OAM wave may have a helical shape. The phase of an OAM wave in a transverse plane may have the form of exp(iφl), φ is the azimuthal angle of the OAM wave and l is an unbounded integer (referred to as an OAM order or mode index).

Helical wavefronts may be generated in several ways. For example, helical wavefronts may be generated by SPPs, for example as illustrated with reference to FIG. 3. SPPs may generate helical waves in the space between the transmitter and the receiver. As another example, helical wavefronts may be generated by transmitter circle arrays (e.g., UCA panels). Transmitter circle arrays may generate helical waves in distributed points: the received signals at antenna elements of a receiver UCA circle may have the same or similar amplitude and progressive phases. Transmitter circle array-based OAM, or UCA-based OAM, may be considered transmitter circle array-based, or UCA-based, MIMO. Transmitter circle array-based OAM, or UCA-based OAM may be associated with high spatial multiplexing degree in a line-of-sight (LOS) channel, which may be associated with a high data rate. Transmitter circle array-based OAM, or UCA-based OAM may be associated with static transmitter/receiver beamforming vector weights. Static transmitter/receiver beamforming vector weights may not involve inter-mode equalization at baseband (under direct alignment conditions), and thus may be associated with a low baseband processing complexity.

With transmitter circle arrays, OAM beams generated via DFT vectors are transmitted in the direction of the boresight of the transmitter circle array (e.g., in the direction perpendicular to the direction of the transmitter circle array panel). Accordingly, the second device 205 may be at a fixed location with respect to the base station 105-*a*.

In some examples, the base station 105-*a* may support access communications with a UE 115-*a* via non-DFT beams transmitted from the same transmitter circle array used for OAM-based backhaul communications with the second device 205. The UE 115-*a* may be at a position that is offset from a direction of the boresight of the transmitter circle array (e.g., an LOS) of the base station 105-*a*. The non-DFT codewords that generate the beams that are steered to the UE 115-*a* may be based on feedback from the UE 115-*a*. For example, the base station 105-*a* may transmit communications parameters to the UE 115-*a* in a message via a communications link 225. The configuration parameters may include a codebook type and the parameters of the UCA codebook. The base station 105-*a* may transmit reference signals from each antenna element of the transmitter circle array. The UE 115-*a* may estimate a channel response matrix based on the reference signals and select one or more codewords for the codebook indicated by the base station 105-*a* in the message based on the channel response matrix. The codewords may include a plurality of non-DFT vectors. The UE 115-*a* may transmit a report to the base station 105-*a* indicating the one or more codewords. The base station 105-*a* may steer beams to the UE 115 via communications link 230 for access communications using the one or more codewords reported by the UE 115.

Figure 3:
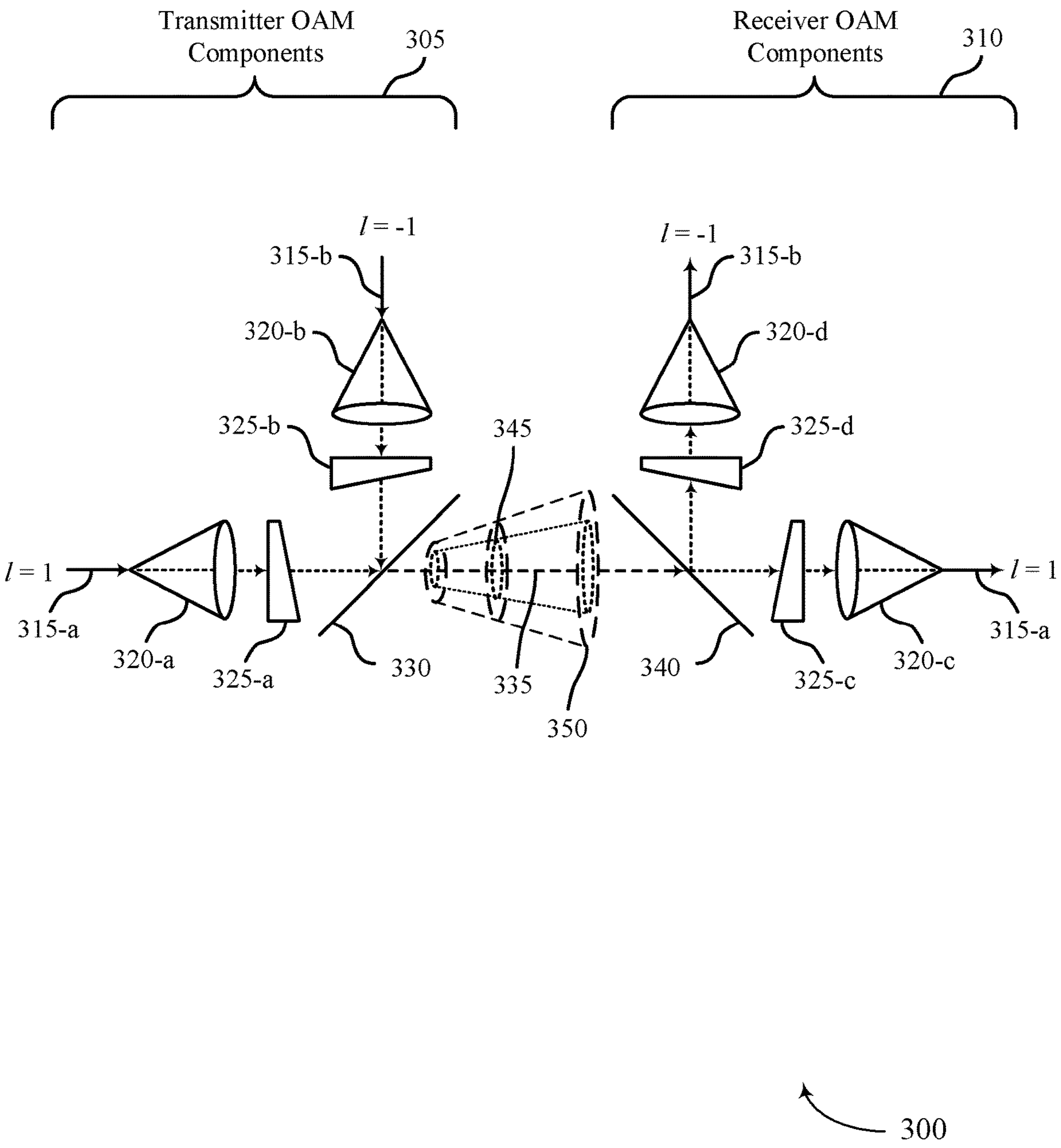
FIG. 3 illustrates an example of a spiral phase plate (SPP) configuration that supports orbital angular momentum (OAM) based communications in accordance with aspects of the present disclosure.

FIG. 3 illustrates an example of an SPP OAM configuration 300 that supports OAM-based communications in accordance with aspects of the present disclosure. In some examples, the SPP OAM configuration 300 may implement aspects of wireless communications systems 100 or 200. In this example, a transmitting device (e.g., a base station) may include transmitter OAM components 305 and a receiving device (e.g., a UE, another base station, IAB node, or a relay node) may include receiver OAM components 310. The transmitter OAM components 305 may support transmission of non-DFT beams using a transmitter circle array such as a UCA panel, which may be configured based on feedback from the receiving device using receiver OAM components 310. The transmitter OAM components 305 or receiver OAM components 310 may be supported by a base station 105 or a UE 115, or other wireless device, as described herein.

In cases in which the wireless devices use an SPP methodology, the transmitting device may convert an electromagnetic wave 315 associated with an OAM mode index l=0 (e.g., a non-helical electromagnetic wave associated with mode-zero OAM) into an electromagnetic wave associated with an OAM mode index l≠0 (e.g., a helical electromagnetic wave associated with a non-zero OAM mode) based on passing the electromagnetic wave through an aperture 320 (or an array of apertures 320) and an SPP 325. Such an SPP 325 may be associated with geometric constraints and may be able to generate an electromagnetic wave associated with a single OAM mode. Thus, the wireless device may use one SPP 325 to generate an OAM beam 335 associated with one OAM mode. As such, a wireless device may implement a different SPP 325 for each OAM beam 335 that is associated with a different OAM mode.

SPPs 325 may be made of a high-density polyethylene. An SPP may be a round plate with a thickness that linearly increases with azimuth angles. When a radio wave propagates through an SPP, such as SPP 325, the spiral surface of the SPP 325 induces different phase shifts, thereby generating a helical wave (e.g., an OAM beam), as the identical phase plane has a spiral shape. Due to the different slopes of different SPPs (e.g., SPPs 325-*a*, 325-*b*, 325-*c*, and 325-*b*), the wave of one OAM mode may be mitigated by the receiver aperture of any different OAM mode.

In the example of FIG. 3, two OAM modes may be used (e.g., 1.=+1 and −1). In the transmitter OAM components, a first electromagnetic wave 315-*a* may be provided to a first aperture 320-*a* and a first SPP 325-*a*, and a second electromagnetic wave 315-*b* may be provided to a second aperture 320-*b* and a second SPP 325-*b*. A beam splitter/combiner 330 may combine the output of the first SPP 325-*a* and the second SPP 325-*b* to generate OAM beam 335. The receiver OAM components 310 may receive the OAM beam 335 as a beam splitter/combiner 340 to provide instances of the OAM beam 335 to a third SPP 325-*c* and a fourth SPP 325-*d* that provide output to a first receiver aperture 320-*c* and a second receiver aperture 320-*d*, respectively. The third SPP 325-*c* may have geometric constraints corresponding to the first SPP 325-*a* and thus the output of the first receiver aperture 320-*c* may correspond to the first electromagnetic wave 315-*a* (e.g., for OAM Mode=1). Likewise, the fourth SPP 325-*d* may have geometric constraints corresponding to the second SPP 325-*b* and thus the output of the second receiver aperture 320-*d* may correspond to the second electromagnetic wave 315-*b* (e.g., for OAM Mode 1.=2). In devices that use SPP methodologies, separate SPPs 325-*a* may thus be used for each OAM mode, and the number of SPPs 325 at a device may constrain the number of usable OAM modes. Thus, in theory, SPPs may generate waveforms with a large number of orthogonal OAM modes. In practice, the number of OAM modes that may be generated by SPPs may be limited. Higher-order OAM modes have a larger dispersion, as a receiver aperture with a certain size may only capture a limited number of OAM modes. For example, as shown in FIG. 3, signals of OAM mode 3 (indicated by reference number 350) may disperse faster than signals of OAM mode 1 (indicated by reference number 345). If the signal strength of OAM mode 3 (350) is larger than receiver aperture (e.g., receiver aperture 320-*c* or 320-*d*), the receiver aperture may not be able to capture the signal of OAM mode 3 and may only capture the signal of OAM mode 1.

As one SPP may generate only one OAM mode, high dimensional multiplexing may be associated with a large number of SPPs. Accordingly, the degree of multiplexing that may be achieved by SPPs may be limited. As discussed, wireless devices described herein, such as those that may include transmitter OAM components 305 or receiver OAM components 310, or both, may support the use of a UCA methodology for OAM communications, an example of such a device is described with reference to FIG. 4.

Figure 4:
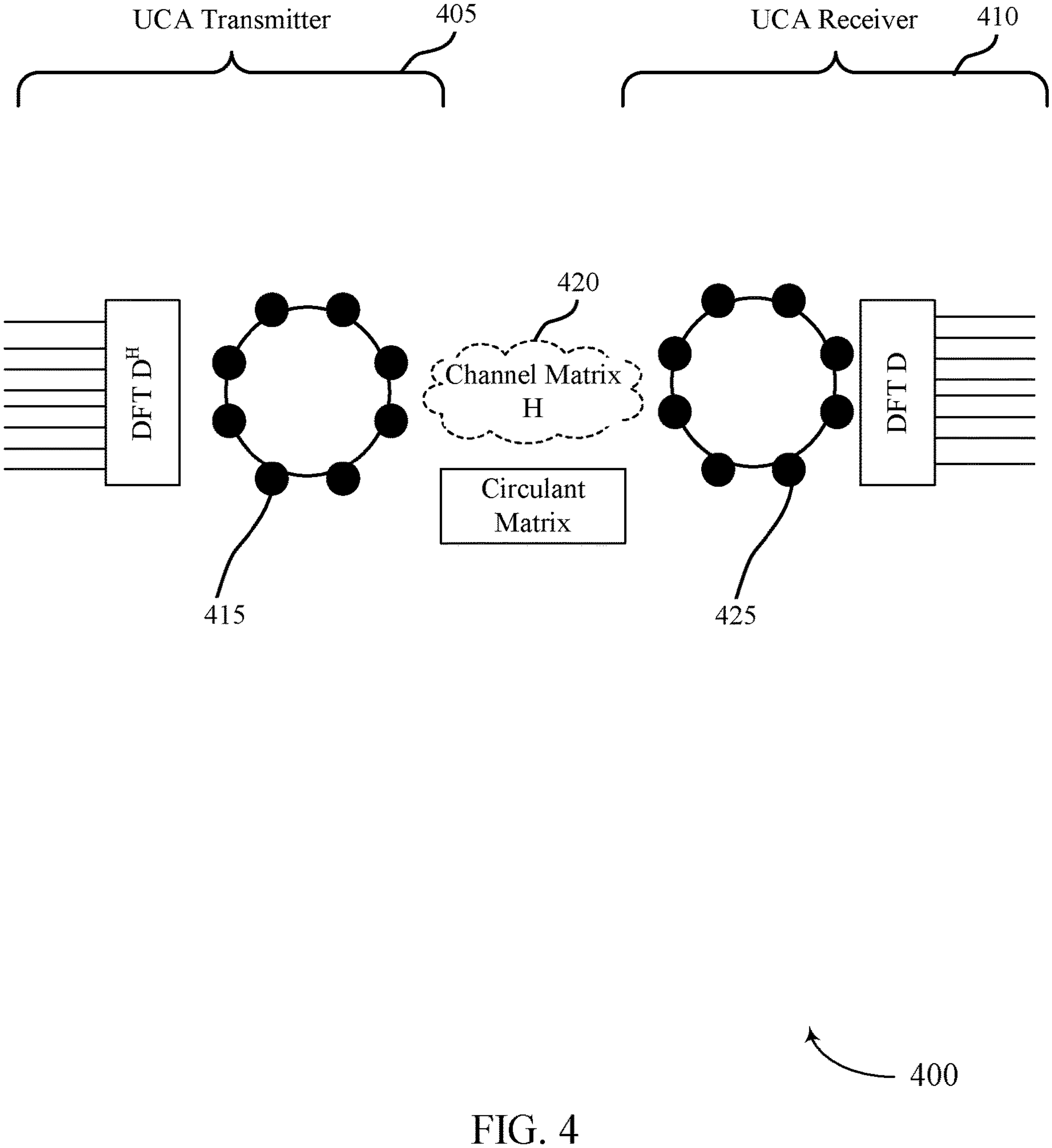
FIG. 4 illustrates an example of a uniform circular array (UCA) that supports OAM-based communications in accordance with aspects of the present disclosure.

FIG. 4 illustrates an example of a UCA configuration 400 that supports OAM-based communications in accordance with aspects of the present disclosure. In some examples, the UCA configuration 400 may implement aspects of wireless communications systems 100 or 200. In this example, a transmitting device (e.g., a base station) may include OAM transmitter UCA antennas 405 and a receiving device (e.g., another base station, a UE, IAB node, or a relay node) may include OAM receiver UCA antennas 410. UCA antenna circles may be used at the transmitter to form phase-shifted received signal values at discrete element positions of UCA antenna circles at the receiver in order to realize multiplexed modes in OAM-based communications, and may be produced at a lower cost as compared to SPPs.

In some aspects, one or both of the OAM transmitter UCA antennas 405 or the OAM receiver UCA antennas 410 may be implemented as a planar array of antenna elements which may be an example of or otherwise function as a (massive or holographic) MIMO array or an intelligent surface. In some cases, the transmitting device may identify a set of antenna elements 415 of the planar array that form a transmitter UCA 405, and a receiving device may identify a set of antenna elements 425 of the planar array that form a receiver UCA 410.

The channel matrix 420 may be denoted from each transmit antenna to each receive antenna as H. The channel matrix 420 may be a circulant matrix, and thus its eigen vectors may be equal to DFT vectors. Because the eigen vectors may be equal to DFT vectors, when DFT vectors are used to generate OAM modes (at the transmitter) and separate OAM modes (at the receiver), there is no inter-channel or inter-mode interference. In the UCA configuration 400, the transmitter UCA 405 and the receiver UCA 410 are co-axial, and have the same number of antenna elements, however the transmitter UCA 405 and the receiver UCA 410 may have different radii. The channel matrix 420, for OAM beams transmitted by the UCA transmitter 405 to the UCA transceiver 410 may be given by Equation 1, shown below.

$$h_{n,m} = \frac{\sqrt{G}\lambda}{4\pi d_{m,n}}\exp\left(-j2\pi\frac{d_{m,n}}{\lambda}\right) \quad (1)$$

Figure 5:
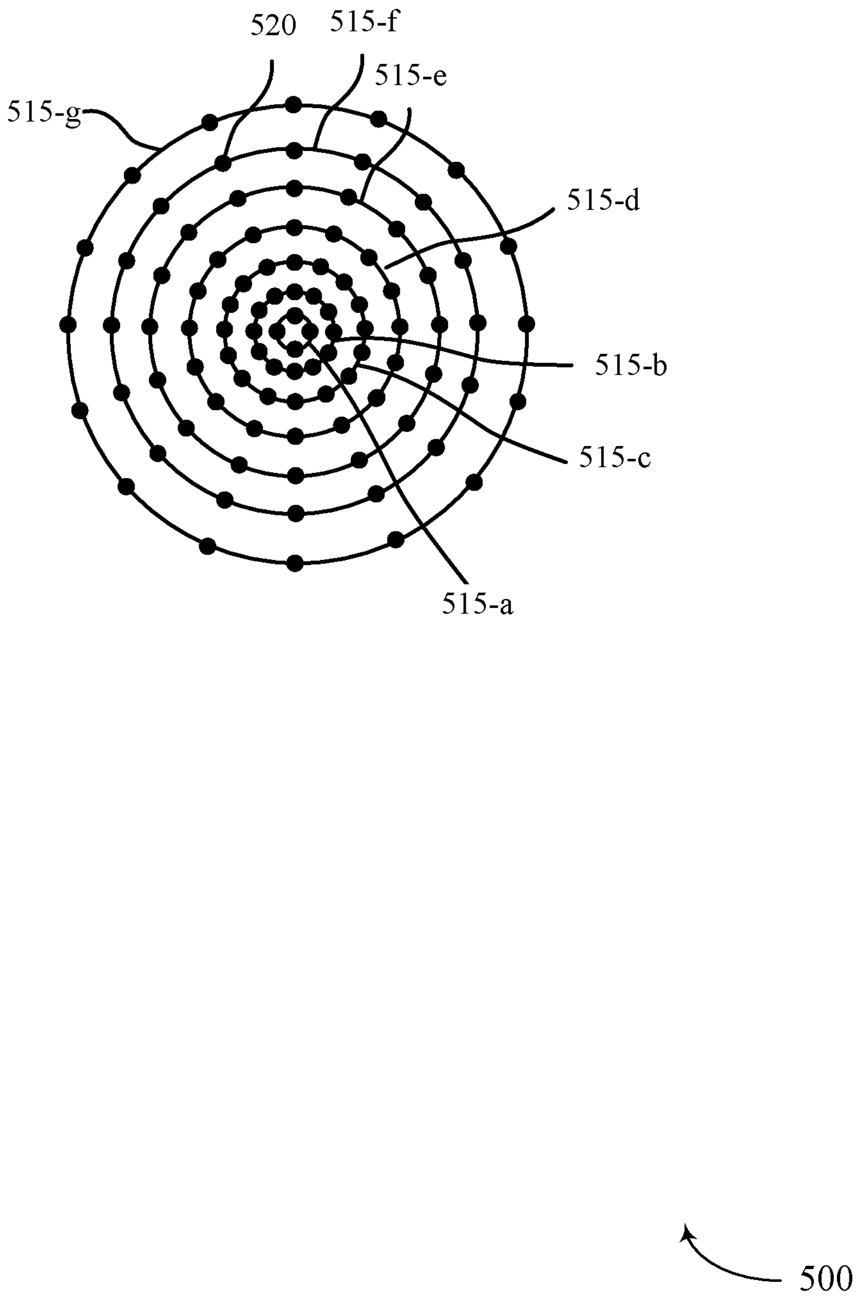
FIG. 5 illustrates an example of a multi-circle transmitter circle array that supports codebook design and feedback for circular antenna array beamforming in accordance with aspects of the present disclosure.

FIG. 5 illustrates an example of a multi-circle transmitter circle array (e.g., a UCA panel) 500 that supports OAM-based communications and codebook design and feedback for circular antenna array beamforming in accordance with aspects of the present disclosure. In some examples, the multi-circle transmitter circle array 500 may implement aspects of wireless communications systems 100 or 200. In this example, a transmitting device (e.g., a base station or UE) may include a transmitter circle array 500 (e.g., a UCA panel). The transmitter circle array 500 may include transmitter circles 515-*a*, 515-*b*, 515-*c*, 515-*d*, 515-*e*, 515-*e*, 515-*f*, and 515-*g*. Each transmitter circle 515-*a*, 515-*b*, 515-*c*, 515-*d*, 515-*e*, 515-*e*, 515-*f*, and 515-*g* includes one or more antenna elements 520.

Multi-circle transmitter circle arrays, such as the transmitter circle array 500, may be used to further increase a spatial multiplexing degree in the radial dimension, and to improve beamforming gain. For transmitting OAM beams, circles of the transmitter may be co-axial and have the same number of antenna elements. For receiving OAM beams, the circles of the receiver circle array may also be co-axial and have the same number of antenna elements. Intra-circle streams with different modes are orthogonal. The inter-circle streams are orthogonal with different OAM modes and non-orthogonal with the same OAM mode.

For example, circles 515-*g*, 515-*f*, 515-*e*, and 515-*d* may be used to transmit OAM beams. Streams of multiple OAM modes in circle 515-*g* may include a mode 1 stream and a mode 2 stream. Streams of multiple OAM modes in circle 515-*f* may include a mode 1 stream and a mode 2 stream. Streams of multiple OAM modes in circle 515-*e* may include a mode 1 stream and a mode 2 stream. Streams of multiple OAM modes in circle 515-*d* may include a mode 1 stream and a mode 2 stream. The transmitter circle array 500 then transmits azimuth-radial two-dimensional spatial multiplexed streams accordingly.

The transmitter circle array 500 may be divided into an inner portion and an outer portion. For example, circles 515-*g*, 515-*f*, 515-*e*, and 515-*d* may be within the outer portion and may be used to transmit OAM beams. Circles 515-*c*, 515-*b*, and 515-*a* may be within the inner portion. Circles 515-*g*, 515-*f*, 515-*e*, and 515-*d* may have identical antenna element numbers (e.g., each circle may have 16 antenna elements). The outer portion may be usable for OAM-based backhaul communications, as larger radii may support more OAM multiplexed modes. Circles 515-*c*, 515-*b*, and 515-*a* may have different numbers of antenna elements (e.g., 16, 12, and 4, respectively), and may not support OAM-based communications as smaller antenna spacing may reduce or eliminate beam aliasing and/or because the aperture area with small circle radii (in the center area of the transmitter circle array 500) may not be able to receive OAM beams. The inner portion, for example, circles 515-*c*, 515-*b*, and 515-*a* may be used for access communications with a UE. Thus, the same transmitter circle array 500 may be used for both backhaul communications and access communications, thereby reducing hardware costs.

Figure 6:
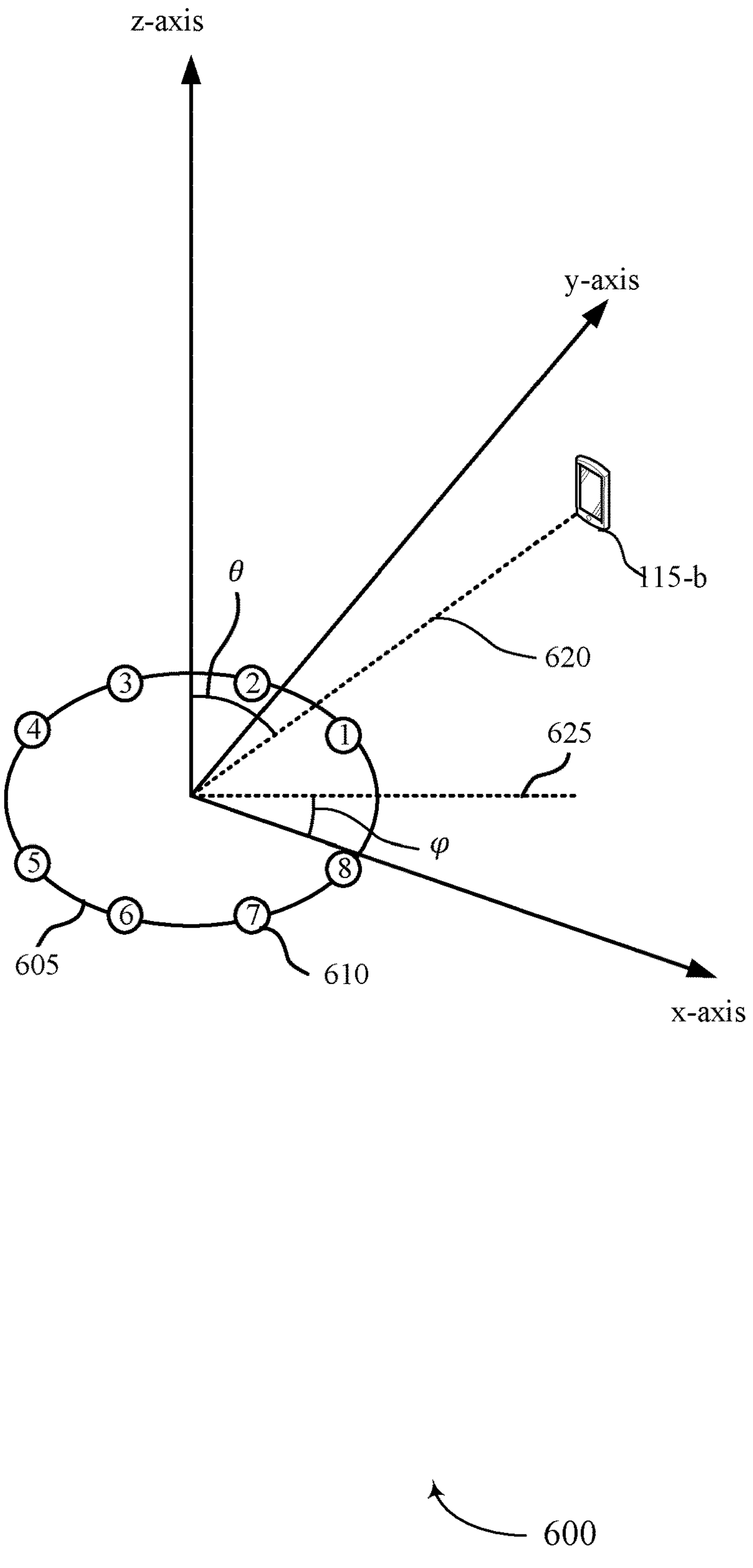
FIG. 6 illustrates an example of a transmitter circle array configuration that supports codebook design and feedback for circular antenna array beamforming in accordance with aspects of the present disclosure.

FIG. 6 illustrates an example of a transmitter circle configuration 600 that supports codebook design and feedback for circular antenna array beamforming in accordance with aspects of the present disclosure. In some examples, the transmitter circle configuration 600 may implement aspects of wireless communications systems 100 or 200. In this example, a transmitting device (e.g., a base station or a UE) may include a transmitter circle 605.

As illustrated, the transmitter circle 605 may have a plurality of antenna elements 610 (e.g., 8 antenna elements). The z-axis, or the boresight direction, is perpendicular to the transmitter circle, which is in the x-y plane. The transmitter circle 605 may steer a beam to a UE 115-*b* (which may be an example of a UE 115 as described herein) using exponential cosine progression as precoding weights, where the precoding weights w for the antenna elements are given by Equation 2 below.

$$w = \frac{1}{\sqrt{N}}\left[e^{j\frac{2\pi r}{\lambda}sin\theta cos\varphi}, e^{j\frac{2\pi r}{\lambda}sin\theta cos\left(\varphi-\frac{2\pi}{N}\right)}, \dots, e^{j\frac{2\pi r}{\lambda}sin\theta cos\left(\varphi-\frac{2\pi(N-1)}{N}\right)}\right] \quad (2)$$

In Equation 2, θ is the angle between the z-axis (or the boresight of the transmitter circle) and the UE's direction line 620. In Equation 2, φ is the angle between the x-axis and the projection line 625 of the UE's direction line 620 onto the x-y plane. In Equation 2, r is the radius of the antenna circle, Nis the antenna number, and λ is the wavelength of the signal.

Codewords for steering beams to a UE 115-*b* from a transmitter circle 605 may be generated based on channel state information feedback from the UE 115-*b*. There may be several options (e.g., several codebook types and associated codebook parameters) for generating codewords for steering beams to a UE 115-*b* from a transmitter circle array.

For example, a type-1 codebook for a transmitter circle array with 1-layer may be associated with the following parameters: transmitter circle radius r, number of antenna elements in the transmitter circle N, wavelength λ, oversampling factors $0_1$ and $0_2$, and inter-polarization coefficient set size N'. The codebook of type-1 is composed of vectors in the form of Equation 3 below, where θ is derived from the enumerated set indicated in Equation 4 below, and φ is derived from the enumerated set indicated in Equation 5 below.

$$w_{\theta,\varphi} = \frac{1}{\sqrt{N}}\left[e^{j\frac{2\pi r}{\lambda}sin\theta cos\varphi}, e^{j\frac{2\pi r}{\lambda}sin\theta cos\left(\varphi-\frac{2\pi}{N}\right)}, \dots, e^{j\frac{2\pi r}{\lambda}sin\theta cos\left(\varphi-\frac{2\pi(N-1)}{N}\right)}\right]^T \quad (3)$$

$$\Theta = \left\{\frac{\pi m}{O_1 N}\right\}_{m=0}^{O_1 N-1} = \left\{0, \frac{\pi}{O_1 N}, \frac{2\pi}{O_1 N}, \dots\right\} \quad (4)$$

$$\Phi = \left\{\frac{2\pi n}{O_2 N}\right\}_{n=0}^{O_2 N-1} = \left\{0, \frac{2\pi}{O_2 N}, \frac{4\pi}{O_2 N}, \dots\right\} \quad (5)$$

To express a codeword $w_{\theta,\varphi}$, $[\log_2(O_1N)]+[\log_2(O_2N)]$ bits may be used in quantization. If two polarizations are used, the precoding weight is given by Equation 6 below, where $\alpha_n$ represents the precoding weights between two polarizations, and $\alpha_n$ is derived from an enumerated set indicated in Equation 7 below. Accordingly, $[\log_2(N')]$ bits may be used to quantize $\alpha_n$.

$$W_{\theta,\varphi,n} = \begin{bmatrix} w_{\theta,\varphi} \\ \alpha_n w_{\theta,\varphi} \end{bmatrix} \quad (6)$$

$$A = \left\{\exp\left(j2\pi\frac{n}{N'}\right)\right\}_{n=(0\sim N)'-1} \quad (7)$$

As another example, a type-1 codebook for a transmitter circle array with multiple layers may be associated with the following parameters: transmitter circle radius r, number of antenna elements in the transmitter circle N, wavelength λ, oversampling factors $0_1$ and $0_2$, and inter-polarization coefficient set size N', and number of layers L. The codebook of type-1 for a transmitter circle array with multiple layers is composed of vectors in the form of Equation 8 below.

$$W_{\{\theta_i,\varphi_i,n_i\}_{i=1\sim L}} = \begin{bmatrix} w_{\theta_1,\varphi_1} & w_{\theta_2,\varphi_2} & \dots & w_{\theta_L,\varphi_L} \\ \alpha_1 w_{\theta_1,\varphi_1}, & \alpha_2 w_{\theta_2,\varphi_2}, & \dots, & \alpha_M w_{\theta_L,\varphi_L} \end{bmatrix} \quad (8)$$

For a type-1 codebook with multiple layers, the precoding vectors of all of the layers may be uncorrelated (e.g., the values of $\{\theta_i, \varphi_i, n_i\}_{i=1\sim L}$ are independent), or the precoding vectors of all the layers may be correlated (e.g., the values of $\{\theta_i, \varphi_i, n_i\}_{i=1\sim L}$ are dependent). If the layers are independent, the number of quantization bits may be given by $L\cdot(\lceil\log_2(O_1N)\rceil+\lceil\log_2(O_2N)\rceil+\lceil\log_2(N')\rceil)$. If the layers are dependent, then the specific dependent relations may be regulated (e.g., standardized) or previously configured, and the number of quantization bits may be given by $\lceil\log_2(O_1N)\rceil+\lceil\log_2(O_2N)\rceil+\lceil\log_2(N')\rceil+\lceil\log_2(P)\rceil$, where P represents the number of dependent relations. Accordingly, uncorrelated layers may be associated with a higher flexibility and accuracy compared to correlated layers, but uncorrelated layers may also be associated with larger overhead costs than correlated layers.

As another example, a type-2 codebook (with either single or multi-layers) may be associated with the following parameters: transmitter circle radius r, number of antenna elements in the transmitter circle N, wavelength λ, oversampling factors $0_1$ and $0_2$, inter-polarization coefficient set size N', number of layers (L), and combination group size (K). For a type-2 codebook, the precoding vector of each layer is the combination of a group of $w_{\theta,\varphi}$. There may be four example options for a type-2 codebook, with the example options being associated with a decreasing flexibility but also a decreasing overhead cost from the first option to the fourth option.

A first example option may include both two polarizations and the L layers having common basis direction vectors in precoding matrix $W_l$, l=1~L, which are given by Equation 9 below.

$$W_l = \begin{bmatrix} \sum_{k=1}^{K} \beta_{l,k} w_{\theta_k,\varphi_k} \\ \sum_{k=1}^{K} \beta_{l,k+K} w_{\theta_k,\varphi_k} \end{bmatrix} \quad (9)$$

$\beta_{l,k}$ and $\beta_{l,k+K}$ are the combination coefficients for layer l and basis vector $w_{\theta_k,\varphi_k}$ at a first polarization and a second polarization, respectively. The amplitude and phase of each $\beta_{l,k}$ or each $\beta_{l,k+K}$ may be quantized independently. In the first example option for a type-2 codebook, the number of quantization bits of $w_{\theta_k,\varphi_k}$ may be given by $K\cdot(\lceil\log_2(O_1N)\rceil+\lceil\log_2(O_2N)\rceil)$.

A second example option for a type-2 codebook may include two polarizations having different basis direction vectors and the L layers having common basis direction vectors in precoding matrix $W_l$, l=1~L, which are given by Equation 10 below.

$$W_l = \begin{bmatrix} \sum_{k=1}^{K} \beta_{l,k} w_{\theta_k,\varphi_k} \\ \sum_{k=1}^{K} \beta_{l,k+K} w_{\theta_{k+K},\varphi_{k+K}} \end{bmatrix} \quad (10)$$

In the second example option for a type-2 codebook, the number of quantization bits of $w_{\theta_k,\varphi_k}$ may be given by $2K\cdot(\lceil \log_2(O_1N)\rceil + \lceil \log_2(O_2N)\rceil)$.

A third example option for a type-2 codebook may include two polarizations having common basis direction vectors and the L layers having different basis direction vectors in precoding matrix $W_1$, l=1~L, which are given by Equation 11 below.

$$W_l = \begin{bmatrix} \sum_{k=1}^{K} \beta_{l,k} w_{\theta_{l,k},\varphi_{l,k}} \\ \sum_{k=1}^{K} \beta_{l,k+K} w_{\theta_{l,k},\varphi_{l,k}} \end{bmatrix} \quad (11)$$

In the third example option for a type-2 codebook, the number of quantization bits of $w_{\theta_k,\varphi_k}$ may be given by $LK\cdot(\lceil \log_2(O_1N)\rceil + \lceil \log_2(O_2N)\rceil)$.

A fourth example option for a type-2 codebook may include two polarizations and the L layers having different basis direction vectors in precoding matrix $W_1$, l=1~L, which are given by Equation 11 below.

$$W_l = \begin{bmatrix} \sum_{k=1}^{K} \beta_{l,k} w_{\theta_{l,k},\varphi_{l,k}} \\ \sum_{k=1}^{K} \beta_{l,k+K} w_{\theta_{l,k+K},\varphi_{l,k+K}} \end{bmatrix} \quad (11)$$

In the fourth example option for a type-2 codebook, the number of quantization bits of $w_{\theta_k,\varphi_k}$ may be given by $2LK\cdot(\lceil \log_2(O_1N)\rceil + \lceil \log_2(O_2N)\rceil)$.

Figure 7:
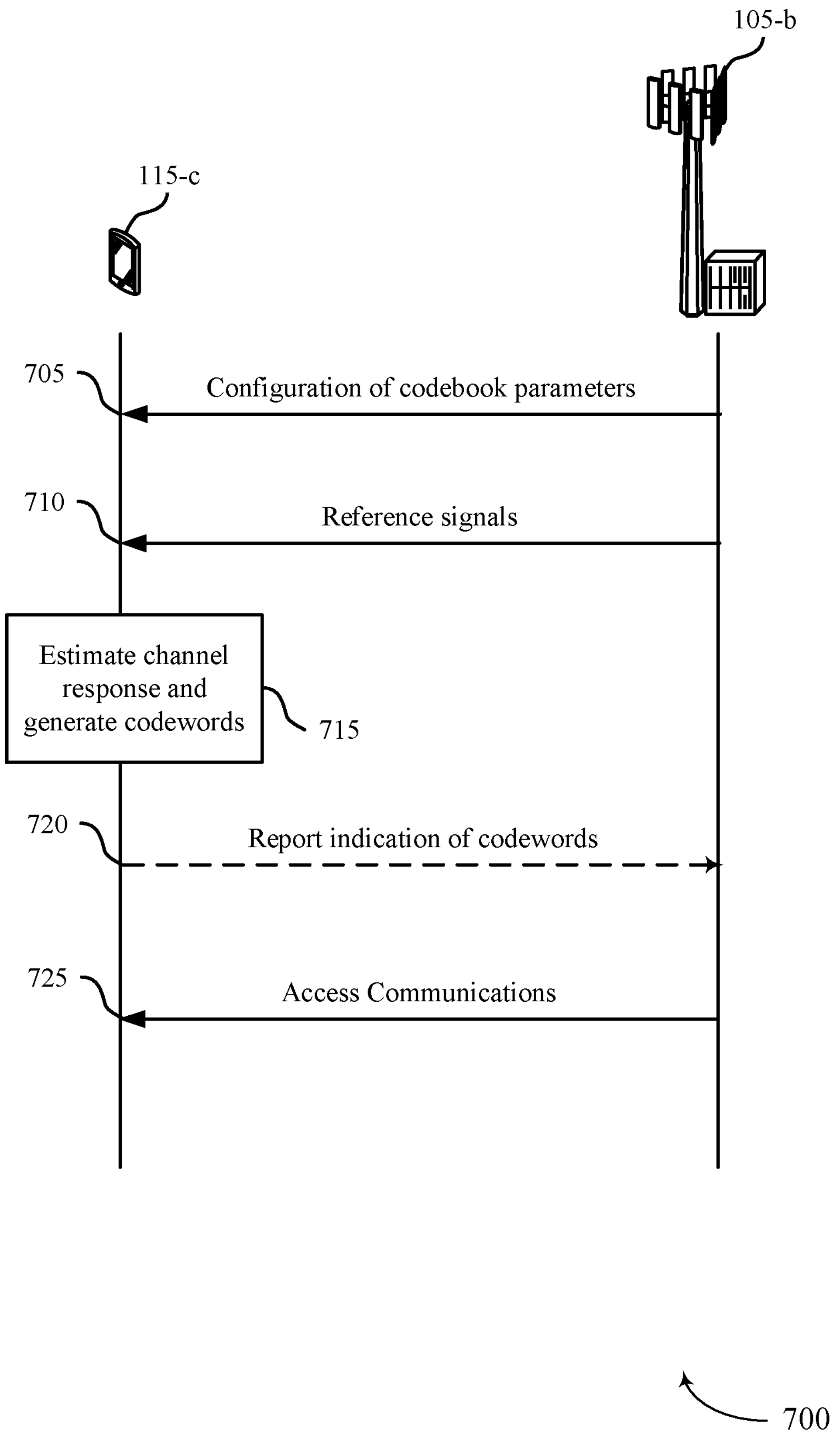
FIG. 7 illustrates an example of a process flow that supports codebook design and feedback for circular antenna array beamforming in accordance with aspects of the present disclosure.

FIG. 7 illustrates an example of a process flow 700 that supports codebook design and feedback for circular antenna array beamforming in accordance with aspects of the present disclosure. In some examples, the process flow 700 may implement aspects of wireless communications systems 100 or 200. The process flow 700 may include a UE 115-*c*, which may be an example of a UE 115 as described herein. The process flow 700 may also include a base station 105-*b*, which may be an example of a base station 105 as described herein. The base station 105-*b* may include a transmitter circle array (e.g., a UCA panel), which may be a transmitter circle array 500 as described with respect to FIG. 5 or a transmitter circle 605 as described with respect to FIG. 6.

At 705, the base station 105-*b* may transmit, to the UE 115-*c*, a configuration message that indicates a codebook type associated with a transmitter circle array of the base station 105-*b*. For example, the codebook type may be any of the codebook types described with respect to FIG. 6 (e.g., type-1 codebook with 1 layer; type-1 codebook with multiple correlated layers, type-1 codebook with multiple uncorrelated layers; type-2 codebook with two polarizations and the L layers having common basis direction vectors, type-2 codebook with two polarizations having different basis direction vectors and the L layers having common basis direction vectors, type-2 codebook with two polarizations having common basis direction vectors and the L layers having different basis direction vectors, or type-2 codebook with two polarizations and the L layers having different basis direction vectors). The configuration message may also include parameters associated with the indicated codebook type. For example, the parameters may include transmitter circle radius r, number of antenna elements in the transmitter circle N, wavelength, oversampling factors $0_1$ and $0_2$, inter-polarization coefficient set size N λ', number of layers (L), and combination group size (K). In some examples, the transmitter circle array may include multiple antenna circles, for example as shown in the transmitter circle array 500 of FIG. 5. If the transmitter circle array includes multiple antenna circles that will be used for access communications with the UE 115-*c* (e.g., antenna circles 515-*a*, 515-*b*, and 515-*c* of transmitter circle array 500 of FIG. 5), then the configuration message may include in the indicated parameters: the number of antenna circles; an inter-circle coefficient set size N" (which may be a value associated with a phase difference between circles); and for each antenna circle: the radius of the antenna circle, the number of antennas elements, and the codebook parameters (e.g., wavelength λ, oversampling factors $0_1$ and $0_2$, inter-polarization coefficient set size N', number of layers (L), and combination group size (K)).

At 710, the base station 105-*b* may transmit reference signals from each antenna element of the transmitter circle array. If the transmitter circle array includes multiple antenna circles, then the base station 105-*b* may transmit reference signals from each antenna element of each antenna circle. In some examples, the base station 105-*b* may indicate a mapping order via reference signal resources to the UE 115-*c* in the configuration message (e.g., whether the mapping occurs from the outside circle to the inside circle or from the inside circle to the outside circle). In some examples, the mapping order may be standardized or predetermined.

At 715, the UE 115-*c* may generate codewords for the codebook indicated in step 705 based on the reference signals received in step 710 and the codebook parameters received in step 705. In some examples, the UE 115-*c* may estimate a channel response matrix based on the reference signals received in step 710, and generate the codewords based on the estimated channel response matrix. In some examples, generating the one or more codewords may include generating a plurality of precoding vectors based on a first angle between a direction of the UE 115-*c* and a direction of the boresight of the transmitter circle array (e.g., angle θ of FIG. 6) and based on a second angle between a projection of direction of the UE 115-*c* on a plane of the transmitter circle array and a direction of a coordinate axis in the plane of the transmitter circle array (e.g., angle φ of FIG. 6). In some examples, generating the codewords may include generating a first codeword associated with a first polarization based at least in part on a set of precoding weights associated with both the first polarization and a second polarization, and generating a second codeword associated with the second polarization based at least in part on the set of precoding weights. In some examples, at least one codeword is associated with a weighted sum of basis direction vectors used for generating the codeword.

In some examples, if the codebook type is a multi-layer codebook and indicated parameters includes a number of layers, generating the codewords may include generating a set of precoding vectors based on the number of layers. In some examples, the precoding vectors may be independent of each other. In some examples, at least one precoding vector may be dependent on another precoding vector in the set.

In some examples, generating the codewords may include generating a first codeword associated with a first layer and a first polarization, and generating a second codeword associated with a second layer and a second polarization. In some examples, the first layer, the second layer, the first polarization, and the second polarization may be associated with common basis direction vectors. In some examples, the first and second layers may be associated with common basis direction vectors; and the first and second polarizations may be associated with different basis direction vectors. In some examples, the first and second layers may be associated with different basis direction vectors; and the first and second polarizations may be associated with common basis direction vectors. In some examples, the second layer, the first polarization, and the second polarization may be associated with different basis direction vectors.

If the transmitter circle array includes multiple antenna circles, then the UE 115-*c* may generate codewords for the codebook for each antenna circle of the transmitter circle array.

At 720, the UE 115-*c* transmits a report indicating the one or more codewords to the base station 105-*b*. In some examples, the UE 115-*c* may transmit, in the report a pre-coding matrix that indicates the generated codewords. In some examples, the UE 115-*c* may transmit, in the report, the quantization bits of the pre-coding matrix. In some examples, the UE 115-*c* may report one set of codewords for a wideband channel. In some examples, the UE 115-*c* may report multiple sets of codewords for multiple subbands. For example, the UE 115-*c* may report a first set of codewords associated with a first subband and a second set of codewords associated with a second subband.

In some examples, the report may indicate a first codeword associated with a first layer and a first polarization and a second codeword associated with a second layer and a second polarization. In some examples, the first layer, the second layer, the first polarization, and the second polarization may be associated with common basis direction vectors. In some examples, the first and second layers may be associated with common basis direction vectors; and the first and second polarizations may be associated with different basis direction vectors. In some examples, the first and second layers may be associated with different basis direction vectors; and the first and second polarizations may be associated with common basis direction vectors. In some examples, the second layer, the first polarization, and the second polarization may be associated with different basis direction vectors.

If the transmitter circle array includes multiple antenna circles, then the UE 115-*c* may report codewords for each circle. In some examples, the UE 115-*c* may transmit, in the report, the quantization bits of the pre-coding matrix for each antenna circle.

At 725, the base station 105-*b* may transmit a downlink data message to the UE 115-*c* using the transmitter circle array based on the codewords reported by the UE 115-*c* in step 720.

Figure 8:
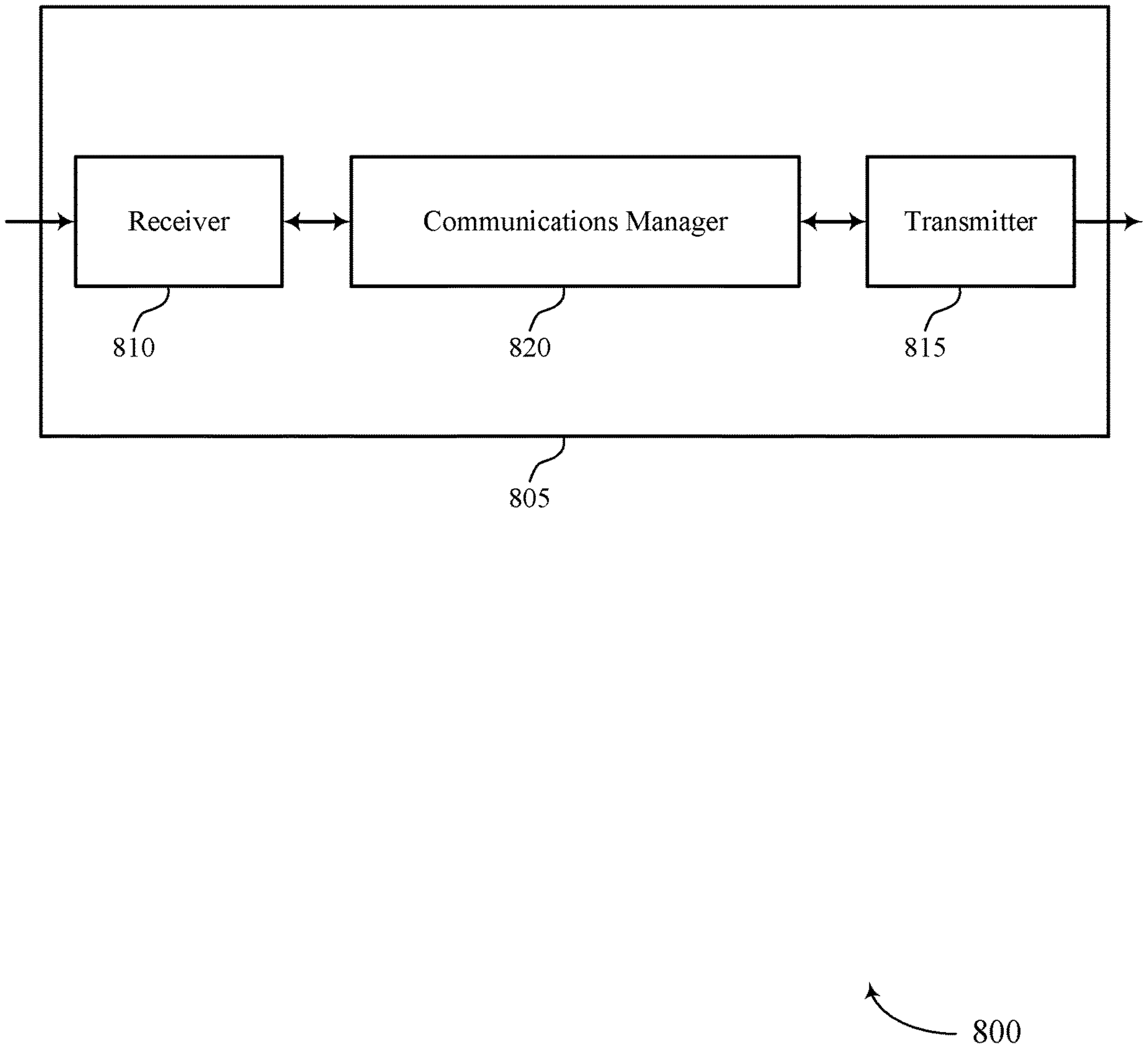
FIGS. 8 and 9 show block diagrams of devices that support codebook design and feedback for circular antenna array beamforming in accordance with aspects of the present disclosure.

FIG. 8 shows a block diagram 800 of a device 805 that supports codebook design and feedback for circular antenna array beamforming in accordance with aspects of the present disclosure. The device 805 may be an example of aspects of a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to codebook design and feedback for circular antenna array beamforming). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to codebook design and feedback for circular antenna array beamforming). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of codebook design and feedback for circular antenna array beamforming as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. For example, the communications manager 820 may be configured as or otherwise support a means for receiving, from a base station, a message that indicates a codebook type associated with a transmitter circle array of the base station and that indicates a set of multiple parameters associated with the codebook type. The communications manager 820 may be configured as or otherwise support a means for receiving, from the base station, a set of multiple reference signals via one or more antenna elements of the transmitter circle array. The communications manager 820 may be configured as or otherwise support a means for generating one or more codewords associated with the transmitter circle array based on the message and the set of multiple reference signals. The communications manager 820 may be configured as or otherwise support a means for transmitting a report indicating the one or more codewords to the base station.

By including or configuring the communications manager 820 in accordance with examples as described herein, the device 805 (e.g., a processor controlling or otherwise coupled to the receiver 810, the transmitter 815, the communications manager 820, or a combination thereof) may support techniques for more efficient utilization of communication resources, for example via the ability to receive downlink beams from a base station transmitted via a transmitter circle array without additional receiver hardware.

Figure 9:
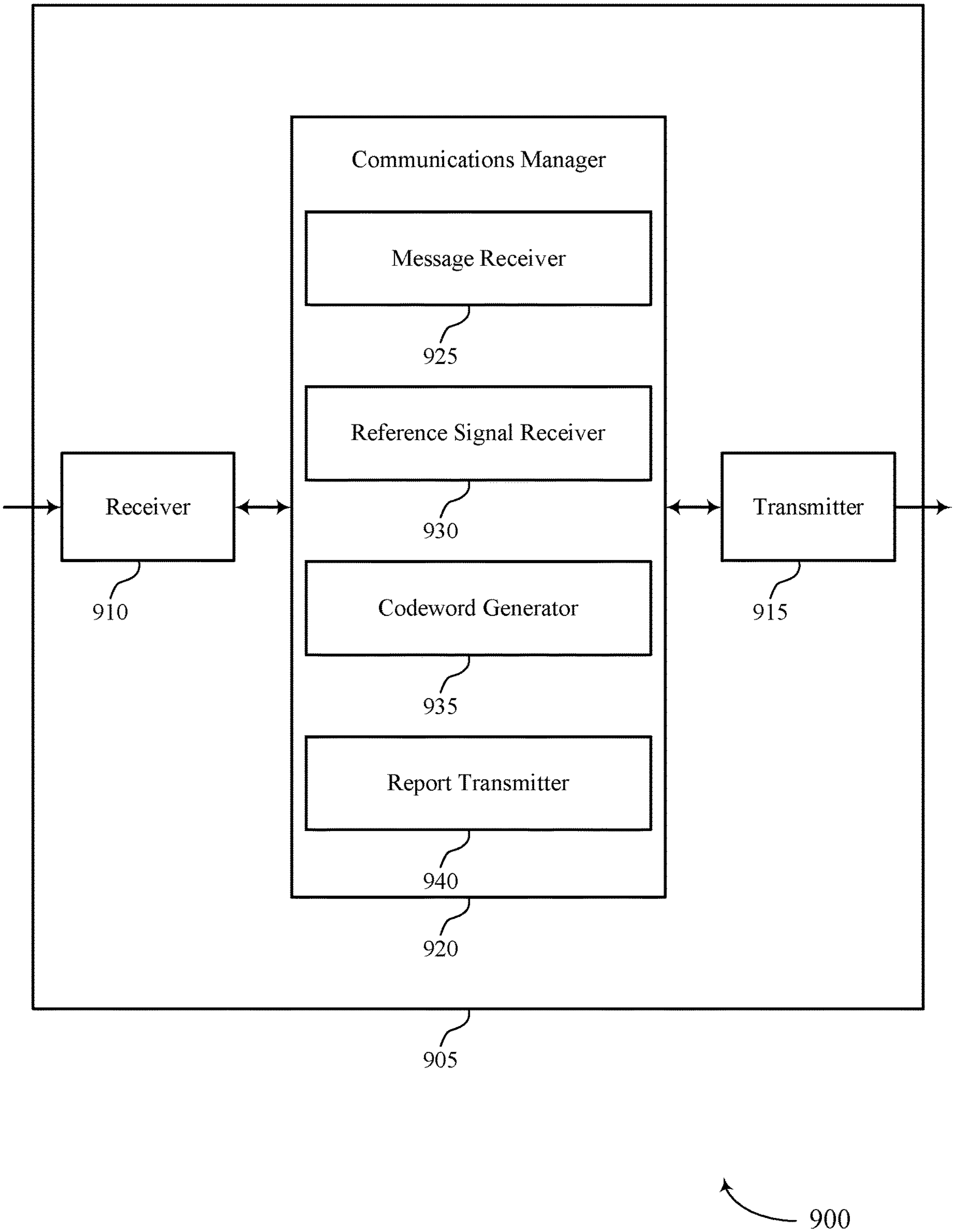

FIG. 9 shows a block diagram 900 of a device 905 that supports codebook design and feedback for circular antenna array beamforming in accordance with aspects of the present disclosure. The device 905 may be an example of aspects of a device 805 or a UE 115 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to codebook design and feedback for circular antenna array beamforming). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to codebook design and feedback for circular antenna array beamforming). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of codebook design and feedback for circular antenna array beamforming as described herein. For example, the communications manager 920 may include a message receiver 925, a reference signal receiver 930, a codeword generator 935, a report transmitter 940, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a UE in accordance with examples as disclosed herein. The message receiver 925 may be configured as or otherwise support a means for receiving, from a base station, a message that indicates a codebook type associated with a transmitter circle array of the base station and that indicates a set of multiple parameters associated with the codebook type. The reference signal receiver 930 may be configured as or otherwise support a means for receiving, from the base station, a set of multiple reference signals via one or more antenna elements of the transmitter circle array. The codeword generator 935 may be configured as or otherwise support a means for generating one or more codewords associated with the transmitter circle array based on the message and the set of multiple reference signals. The report transmitter 940 may be configured as or otherwise support a means for transmitting a report indicating the one or more codewords to the base station.

Figure 10:
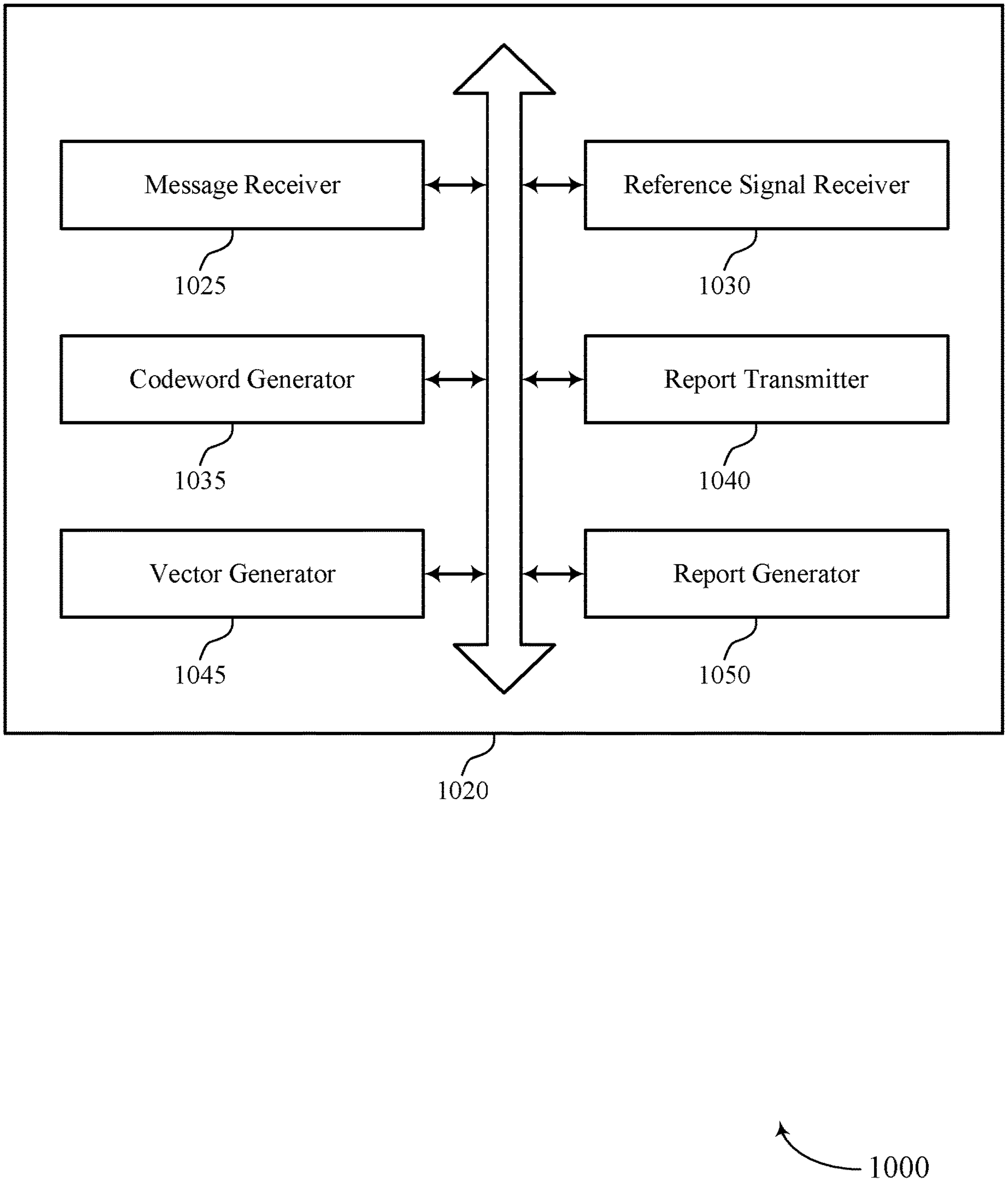
FIG. 10 shows a block diagram of a communications manager that supports codebook design and feedback for circular antenna array beamforming in accordance with aspects of the present disclosure.

FIG. 10 shows a block diagram 1000 of a communications manager 1020 that supports codebook design and feedback for circular antenna array beamforming in accordance with aspects of the present disclosure. The communications manager 1020 may be an example of aspects of a communications manager 820, a communications manager 920, or both, as described herein. The communications manager 1020, or various components thereof, may be an example of means for performing various aspects of codebook design and feedback for circular antenna array beamforming as described herein. For example, the communications manager 1020 may include a message receiver 1025, a reference signal receiver 1030, a codeword generator 1035, a report transmitter 1040, a vector generator 1045, a report generator 1050, or any combination thereof. Each of these components may communicate, directly or indirectly, with one another (e.g., via one or more buses).

The communications manager 1020 may support wireless communications at a UE in accordance with examples as disclosed herein. The message receiver 1025 may be configured as or otherwise support a means for receiving, from a base station, a message that indicates a codebook type associated with a transmitter circle array of the base station and that indicates a set of multiple parameters associated with the codebook type. The reference signal receiver 1030 may be configured as or otherwise support a means for receiving, from the base station, a set of multiple reference signals via one or more antenna elements of the transmitter circle array. The codeword generator 1035 may be configured as or otherwise support a means for generating one or more codewords associated with the transmitter circle array based on the message and the set of multiple reference signals. The report transmitter 1040 may be configured as or otherwise support a means for transmitting a report indicating the one or more codewords to the base station.

In some examples, to support generating the one or more codewords, the codeword generator 1035 may be configured as or otherwise support a means for generating the one or more codewords of the codebook type based on the set of multiple parameters, where the set of multiple parameters associated with the codebook type includes a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

In some examples, to support generating the one or more codewords, the vector generator 1045 may be configured as or otherwise support a means for generating a set of multiple precoding vectors based on a first angle between a direction of the UE and a direction of the boresight of the transmitter circle array and based on a second angle between a projection of direction of the UE on a plane of the transmitter circle array and a direction of a coordinate axis in the plane of the transmitter circle array.

In some examples, to support generating the one or more codewords, the codeword generator 1035 may be configured as or otherwise support a means for generating a first codeword associated with a first polarization based on a set of precoding weights associated with both the first polarization and a second polarization. In some examples, to support generating the one or more codewords, the codeword generator 1035 may be configured as or otherwise support a means for generating a second codeword associated with the second polarization based on the set of precoding weights.

In some examples, to support generating the one or more codewords, the vector generator 1045 may be configured as or otherwise support a means for generating a set of precoding vectors based on the number of layers, where the set of precoding vectors includes precoding vectors that are independent of each other.

In some examples, to support generating the one or more codewords, the vector generator 1045 may be configured as or otherwise support a means for generating a set of precoding vectors based on the number of layers, where the set of precoding vectors includes at least one precoding vector that is dependent on another precoding vector of the set of precoding vectors.

In some examples, to support generating the one or more codewords, the codeword generator 1035 may be configured as or otherwise support a means for generating a first codeword associated with a first layer and a first polarization. In some examples, to support generating the one or more codewords, the codeword generator 1035 may be configured as or otherwise support a means for generating a second codeword associated with a second layer and a second polarization.

In some examples, the first layer, the second layer, the first polarization, and the second polarization are associated with common basis direction vectors.

In some examples, the first and second layers are associated with common basis direction vectors. In some examples, the first and second polarizations are associated with different basis direction vectors.

In some examples, the first and second layers are associated with different basis direction vectors. In some examples, the first and second polarizations are associated with common basis direction vectors.

In some examples, the first layer, the second layer, the first polarization, and the second polarization are associated with different basis direction vectors.

In some examples, a codeword of the one or more codewords is associated with a weighted sum of basis direction vectors used for generating the codeword.

In some examples, the report generator 1050 may be configured as or otherwise support a means for generating the report including a first set of codewords associated with a wideband channel.

In some examples, the report generator 1050 may be configured as or otherwise support a means for generating the report including a first set of codewords associated with a first subband and a second set of codewords associated with a second subband.

In some examples, to support generating the one or more codewords, the codeword generator 1035 may be configured as or otherwise support a means for generating respective sets of one or more codewords for each transmitter circle of the transmitter circle array.

In some examples, the report includes a set of quantization bits indicative of a precoding matrix indicator associated with the one or more codewords.

Figure 11:
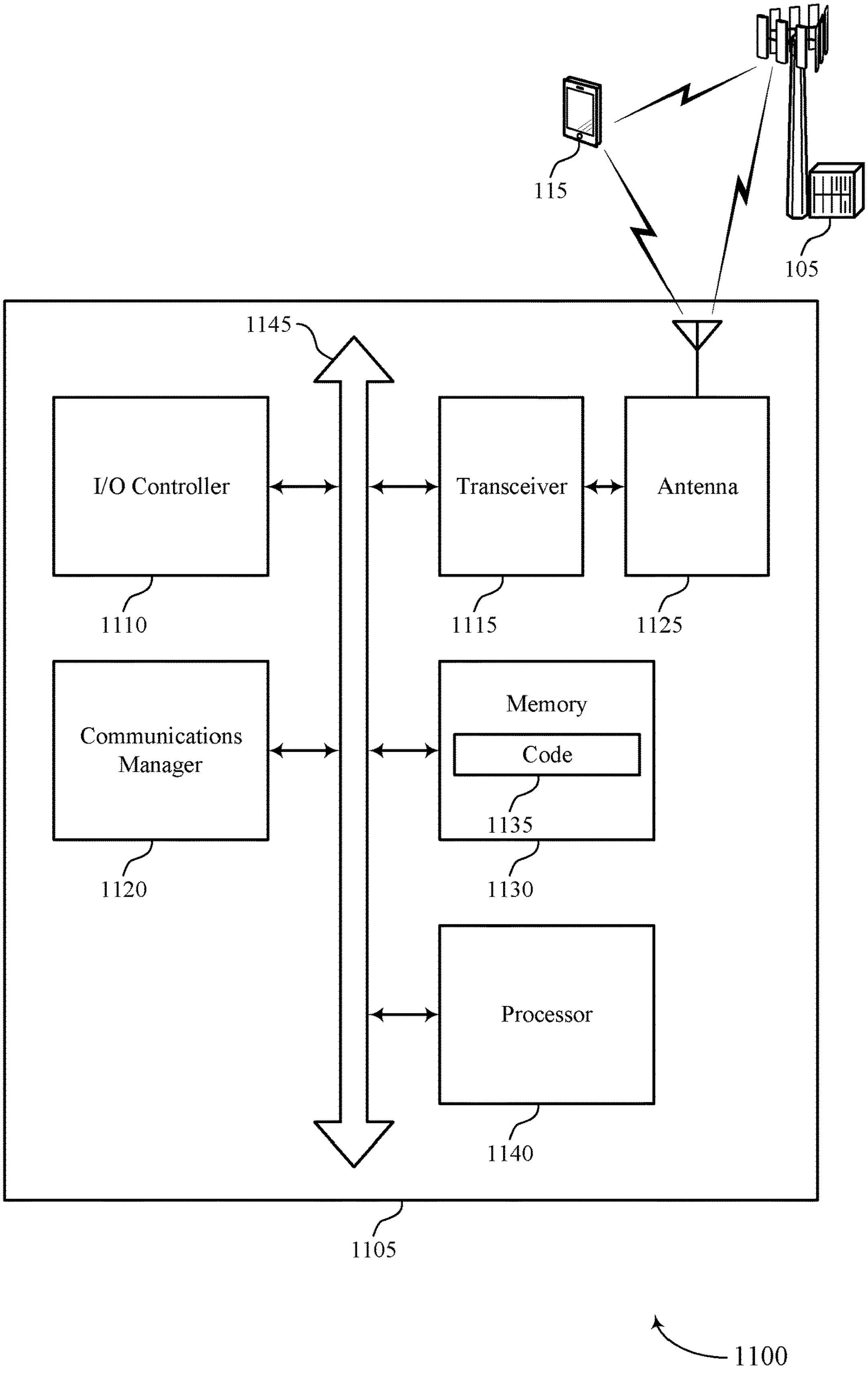
FIG. 11 shows a diagram of a system including a device that supports codebook design and feedback for circular antenna array beamforming in accordance with aspects of the present disclosure.

FIG. 11 shows a diagram of a system 1100 including a device 1105 that supports codebook design and feedback for circular antenna array beamforming in accordance with aspects of the present disclosure. The device 1105 may be an example of or include the components of a device 805, a device 905, or a UE 115 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, an input/output (I/O) controller 1110, a transceiver 1115, an antenna 1125, a memory 1130, code 1135, and a processor 1140. These components may be in electronic communication or otherwise coupled (e.g., operatively, communicatively, functionally, electronically, electrically) via one or more buses (e.g., a bus 1145).

The I/O controller 1110 may manage input and output signals for the device 1105. The I/O controller 1110 may also manage peripherals not integrated into the device 1105. In some cases, the I/O controller 1110 may represent a physical connection or port to an external peripheral. In some cases, the I/O controller 1110 may utilize an operating system such as iOS®, ANDROID®, MS-DOS®, MS-WINDOWS®, OS/2®, UNIX®, LINUX®, or another known operating system. Additionally or alternatively, the I/O controller 1110 may represent or interact with a modem, a keyboard, a mouse, a touchscreen, or a similar device. In some cases, the I/O controller 1110 may be implemented as part of a processor, such as the processor 1140. In some cases, a user may interact with the device 1105 via the I/O controller 1110 or via hardware components controlled by the I/O controller 1110.

In some cases, the device 1105 may include a single antenna 1125. However, in some other cases, the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include random access memory (RAM) and read-only memory (ROM). The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a basic I/O system (BIOS) which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting codebook design and feedback for circular antenna array beamforming). For example, the device 1105 or a component of the device 1105 may include a processor 1140 and memory 1130 coupled to the processor 1140, the processor 1140 and memory 1130 configured to perform various functions described herein.

The communications manager 1120 may support wireless communications at a UE in accordance with examples as disclosed herein. For example, the communications manager 1120 may be configured as or otherwise support a means for receiving, from a base station, a message that indicates a codebook type associated with a transmitter circle array of the base station and that indicates a set of multiple parameters associated with the codebook type. The communications manager 1120 may be configured as or otherwise support a means for receiving, from the base station, a set of multiple reference signals via one or more antenna elements of the transmitter circle array. The communications manager 1120 may be configured as or otherwise support a means for generating one or more codewords associated with the transmitter circle array based on the message and the set of multiple reference signals. The communications manager 1120 may be configured as or otherwise support a means for transmitting a report indicating the one or more codewords to the base station.

By including or configuring the communications manager 1120 in accordance with examples as described herein, the device 1105 may support techniques for techniques for more efficient utilization of communication resources, for example via the ability to receive downlink beams from a base station transmitted via a transmitter circle array, which may be associated with improved communication reliability, more efficient utilization of communication resources, and improved coordination between devices (e.g., the UE and a base station).

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of codebook design and feedback for circular antenna array beamforming as described herein, or the processor 1140 and the memory 1130 may be otherwise configured to perform or support such operations.

Figure 12:
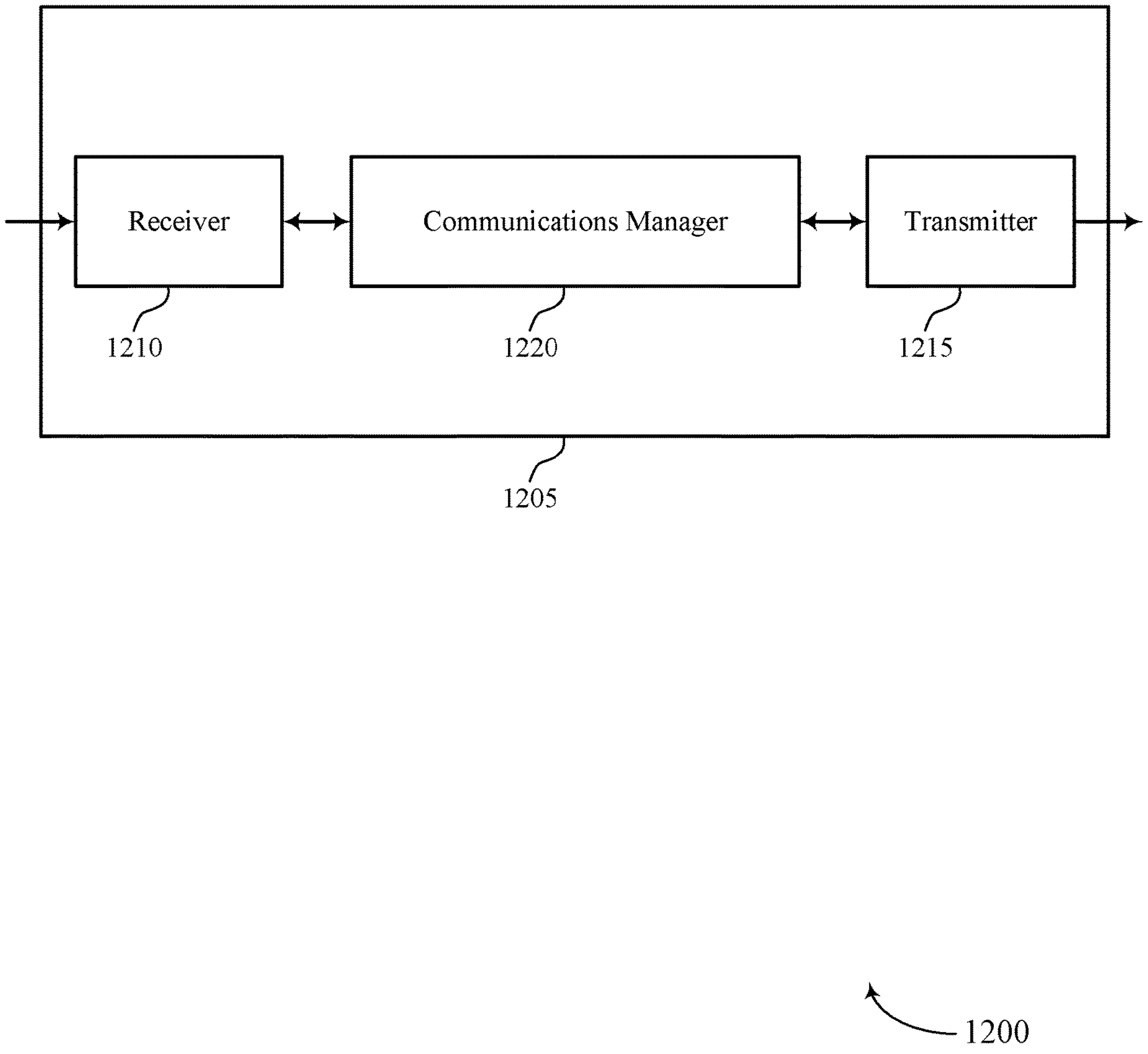
FIGS. 12 and 13 show block diagrams of devices that support codebook design and feedback for circular antenna array beamforming in accordance with aspects of the present disclosure.

FIG. 12 shows a block diagram 1200 of a device 1205 that supports codebook design and feedback for circular antenna array beamforming in accordance with aspects of the present disclosure. The device 1205 may be an example of aspects of a base station 105 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to codebook design and feedback for circular antenna array beamforming). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to codebook design and feedback for circular antenna array beamforming). In some examples, the transmitter 1215 may be co-located with a receiver 1210 in a transceiver module. The transmitter 1215 may utilize a single antenna or a set of multiple antennas.

The communications manager 1220, the receiver 1210, the transmitter 1215, or various combinations thereof or various components thereof may be examples of means for performing various aspects of codebook design and feedback for circular antenna array beamforming as described herein. For example, the communications manager 1220, the receiver 1210, the transmitter 1215, or various combinations or components thereof may support a method for performing one or more of the functions described herein.

In some examples, the communications manager 1220, the receiver 1210, the transmitter 1215, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1220, the receiver 1210, the transmitter 1215, or various combinations or components thereof may be implemented in code (e.g., as communications management software or firmware) executed by a processor. If implemented in code executed by a processor, the functions of the communications manager 1220, the receiver 1210, the transmitter 1215, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1220 may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a base station in accordance with examples as disclosed herein. For example, the communications manager 1220 may be configured as or otherwise support a means for transmitting, to a UE, a message that indicates a codebook type associated with a transmitter circle array of the base station and that indicates a set of multiple parameters associated with the codebook type. The communications manager 1220 may be configured as or otherwise support a means for transmitting, to the UE, a set of multiple reference signals via one or more antenna elements of the transmitter circle array. The communications manager 1220 may be configured as or otherwise support a means for receiving, from the UE, a report indicating one or more codewords associated with the transmitter circle array based on the set of multiple reference signals, the codebook type, and the set of multiple parameters. The communications manager 1220 may be configured as or otherwise support a means for transmitting, to the UE, a downlink data message using one or more transmitter circles of the transmitter circle array based on the report.

By including or configuring the communications manager 1220 in accordance with examples as described herein, the device 1205 (e.g., a processor controlling or otherwise coupled to the receiver 1210, the transmitter 1215, the communications manager 1220, or a combination thereof) may support techniques for more efficient utilization of communication resources, for example via the ability to transmit access beams from the same transmitter circle array of the base station transmitted which may be used for access communications.

Figure 13:
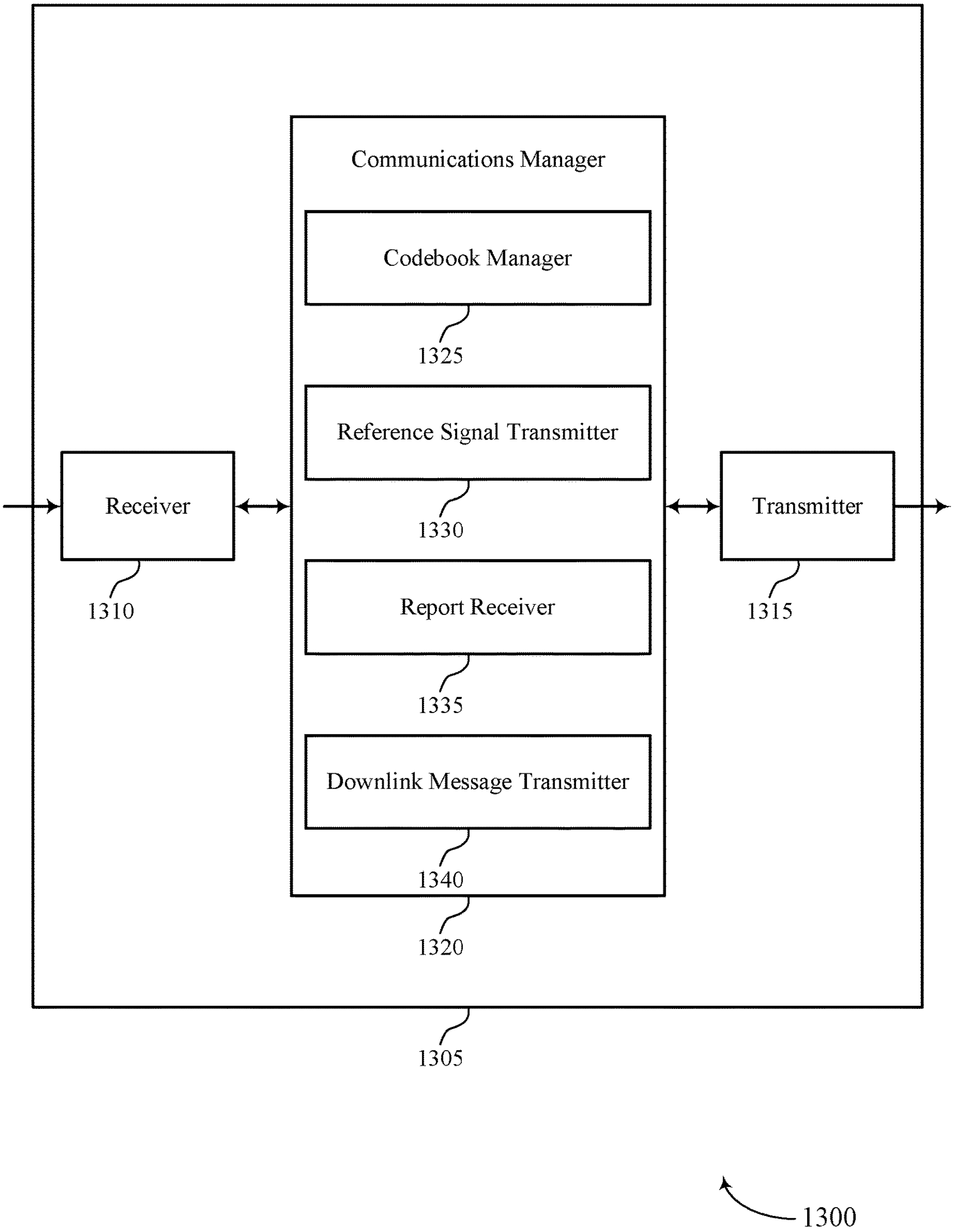

FIG. 13 shows a block diagram 1300 of a device 1305 that supports codebook design and feedback for circular antenna array beamforming in accordance with aspects of the present disclosure. The device 1305 may be an example of aspects of a device 1205 or a base station 105 as described herein. The device 1305 may include a receiver 1310, a transmitter 1315, and a communications manager 1320. The device 1305 may also include a processor. Each of these components may be in communication with one another (e.g., via one or more buses).

The receiver 1310 may provide a means for receiving information such as packets, user data, control information, or any combination thereof associated with various information channels (e.g., control channels, data channels, information channels related to codebook design and feedback for circular antenna array beamforming). Information may be passed on to other components of the device 1305. The receiver 1310 may utilize a single antenna or a set of multiple antennas.

The transmitter 1315 may provide a means for transmitting signals generated by other components of the device 1305. For example, the transmitter 1315 may transmit information such as packets, user data, control information, or any combination thereof associated with various information channels (e.g., control channels, data channels, information channels related to codebook design and feedback for circular antenna array beamforming). In some examples, the transmitter 1315 may be co-located with a receiver 1310 in a transceiver module. The transmitter 1315 may utilize a single antenna or a set of multiple antennas.

The device 1305, or various components thereof, may be an example of means for performing various aspects of codebook design and feedback for circular antenna array beamforming as described herein. For example, the communications manager 1320 may include a codebook manager 1325, a reference signal transmitter 1330, a report receiver 1335, a downlink message transmitter 1340, or any combination thereof. The communications manager 1320 may be an example of aspects of a communications manager 1220 as described herein. In some examples, the communications manager 1320, or various components thereof, may be configured to perform various operations (e.g., receiving, monitoring, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to receive information, transmit information, or perform various other operations as described herein.

The communications manager 1320 may support wireless communication at a base station in accordance with examples as disclosed herein. The codebook manager 1325 may be configured as or otherwise support a means for transmitting, to a UE, a message that indicates a codebook type associated with a transmitter circle array of the base station and that indicates a set of multiple parameters associated with the codebook type. The reference signal transmitter 1330 may be configured as or otherwise support a means for transmitting, to the UE, a set of multiple reference signals via one or more antenna elements of the transmitter circle array. The report receiver 1335 may be configured as or otherwise support a means for receiving, from the UE, a report indicating one or more codewords associated with the transmitter circle array based on the set of multiple reference signals, the codebook type, and the set of multiple parameters. The downlink message transmitter 1340 may be configured as or otherwise support a means for transmitting, to the UE, a downlink data message using one or more transmitter circles of the transmitter circle array based on the report.

Figure 14:
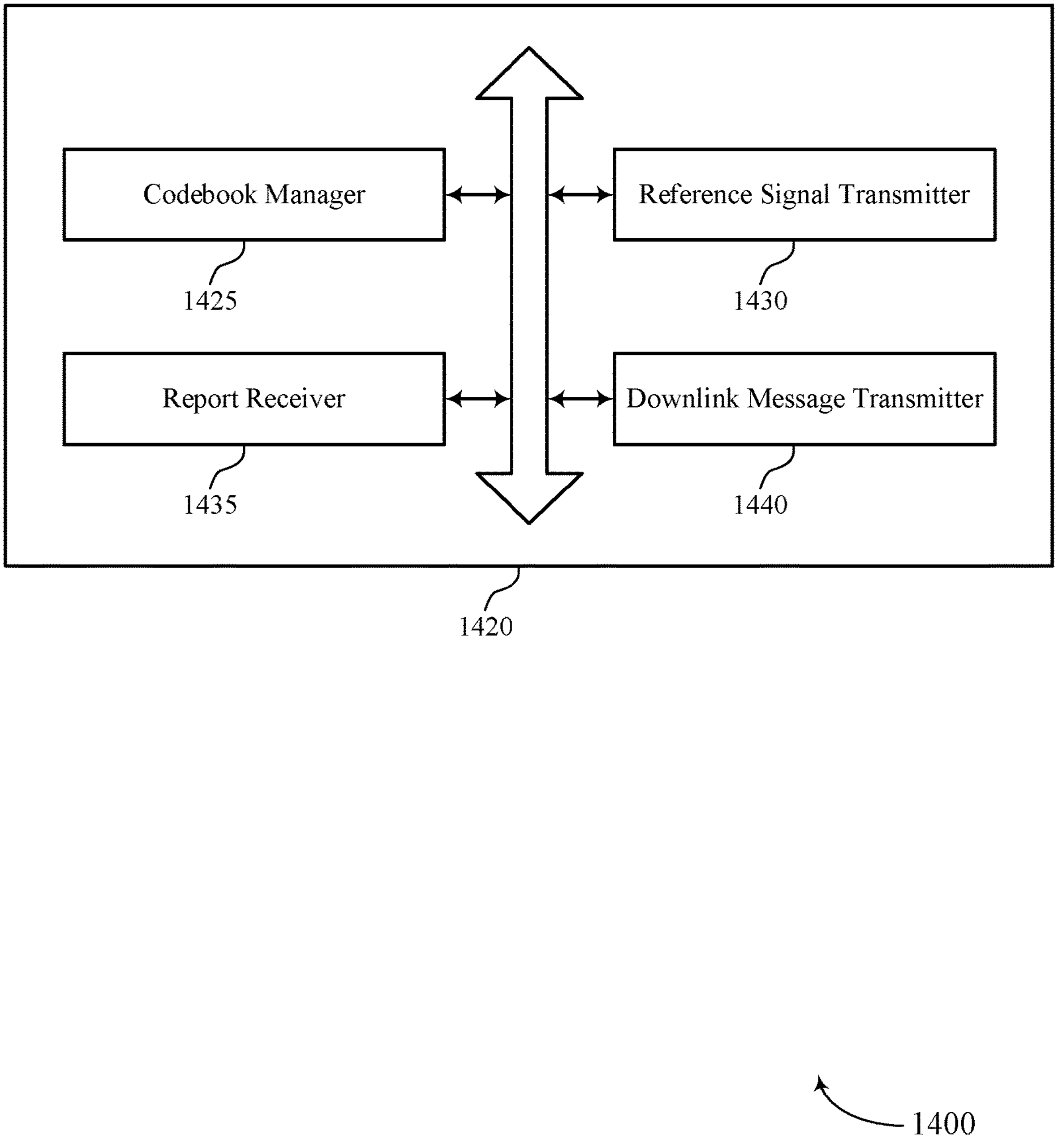
FIG. 14 shows a block diagram of a communications manager that supports codebook design and feedback for circular antenna array beamforming in accordance with aspects of the present disclosure.

FIG. 14 shows a block diagram 1400 of a communications manager 1420 that supports codebook design and feedback for circular antenna array beamforming in accordance with aspects of the present disclosure. The communications manager 1420 may be an example of aspects of a communications manager 1220, a communications manager 1320, or both, as described herein. The communications manager 1420, or various components thereof, may be an example of means for performing various aspects of codebook design and feedback for circular antenna array beamforming as described herein. For example, the communications manager 1420 may include a codebook manager 1425, a reference signal transmitter 1430, a report receiver 1435, a downlink message transmitter 1440, or any combination thereof. Each of these components may communicate, directly or indirectly, with one another (e.g., via one or more buses).

The communications manager 1420 may support wireless communication at a base station in accordance with examples as disclosed herein. The codebook manager 1425 may be configured as or otherwise support a means for transmitting, to a UE, a message that indicates a codebook type associated with a transmitter circle array of the base station and that indicates a set of multiple parameters associated with the codebook type. The reference signal transmitter 1430 may be configured as or otherwise support a means for transmitting, to the UE, a set of multiple reference signals via one or more antenna elements of the transmitter circle array. The report receiver 1435 may be configured as or otherwise support a means for receiving, from the UE, a report indicating one or more codewords associated with the transmitter circle array based on the set of multiple reference signals, the codebook type, and the set of multiple parameters. The downlink message transmitter 1440 may be configured as or otherwise support a means for transmitting, to the UE, a downlink data message using one or more transmitter circles of the transmitter circle array based on the report.

In some examples, the set of multiple parameters associated with the codebook type includes a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

In some examples, the one or more codewords are associated with a set of multiple precoding vectors, the set of multiple precoding vectors based on a first angle between a direction of the UE and a direction of the boresight of the transmitter circle array and based on a second angle between a projection of direction of the UE on a plane of the transmitter circle array and a direction of a coordinate axis in the plane of the transmitter circle array.

In some examples, to support receiving the report, the report receiver 1435 may be configured as or otherwise support a means for receiving the report including a first codeword associated with a first polarization that is based on a set of precoding weights associated with both the first polarization and a second polarization, where the report includes a second codeword associated with the second polarization and the set of precoding weights.

In some examples, the codebook type is a multi-layer codebook and the set of multiple parameters includes a number of layers. In some examples, the one or more codewords are based on a set of precoding vectors and the number of layers, where the set of precoding vectors includes precoding vectors that are independent of each other.

In some examples, a codeword of the one or more codewords is associated with a weighted sum of the basis direction vectors.

In some examples, the report indicates a first codeword associated with a first layer and a first polarization. In some examples, the report indicates a second codeword associated with a second layer and a second polarization.

In some examples, the first layer, the second layer, the first polarization, and the second polarization are associated with common basis direction vectors.

In some examples, the first and second layers are associated with common basis direction vectors. In some examples, the first and second polarizations are associated with different basis direction vectors.

In some examples, the first and second layers are associated with different basis direction vectors. In some examples, the first and second polarizations are associated with common basis direction vectors.

In some examples, the first layer, the second layer, the first polarization, and the second polarization are associated with different basis direction vectors.

In some examples, the report includes a first set of codewords associated with a wideband channel.

In some examples, the report includes a first set of codewords associated with a first subband and a second set of codewords associated with a second subband.

In some examples, the report includes respective sets of one or more codewords for each transmitter circle of the transmitter circle array based on the set of multiple reference signals.

In some examples, the report includes a set of quantization bits indicative of a precoding matrix indicator associated with the one or more codewords.

Figure 15:
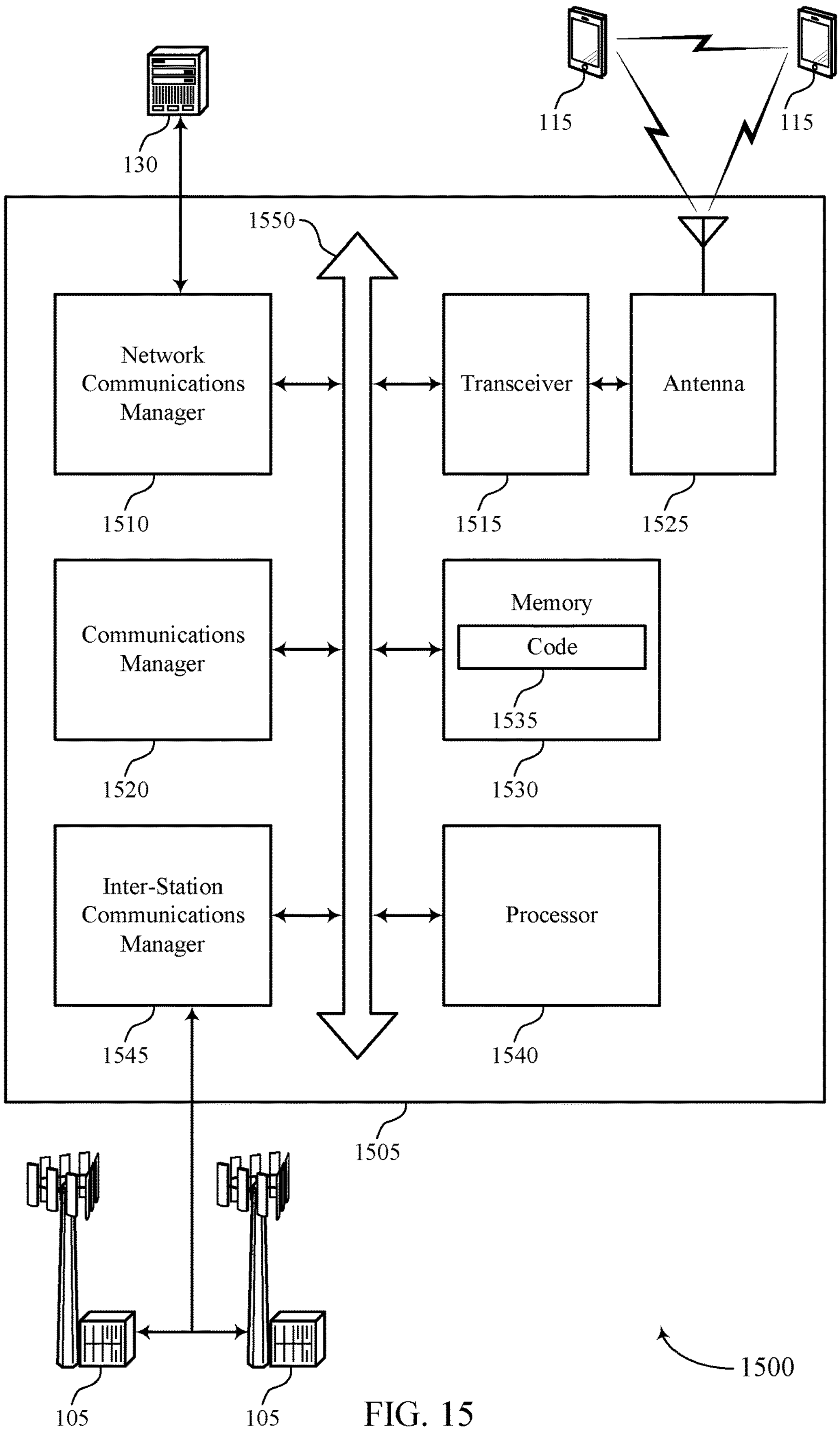
FIG. 15 shows a diagram of a system including a device that supports codebook design and feedback for circular antenna array beamforming in accordance with aspects of the present disclosure.

FIG. 15 shows a diagram of a system 1500 including a device 1505 that supports codebook design and feedback for circular antenna array beamforming in accordance with aspects of the present disclosure. The device 1505 may be an example of or include the components of a device 1205, a device 1305, or a base station 105 as described herein. The device 1505 may communicate wirelessly with one or more base stations 105, UEs 115, or any combination thereof. The device 1505 may include components for bi-directional voice and data communications including components for transmitting and receiving communications, such as a communications manager 1520, a network communications manager 1510, a transceiver 1515, an antenna 1525, a memory 1530, code 1535, a processor 1540, and an inter-station communications manager 1545. These components may be in electronic communication or otherwise coupled (e.g., operatively, communicatively, functionally, electronically, electrically) via one or more buses (e.g., a bus 1550).

The network communications manager 1510 may manage communications with a core network 130 (e.g., via one or more wired backhaul links). For example, the network communications manager 1510 may manage the transfer of data communications for client devices, such as one or more UEs 115.

In some cases, the device 1505 may include a single antenna 1525. However, in some other cases the device 1505 may have more than one antenna 1525, which may be capable of concurrently transmitting or receiving multiple wireless transmissions. The transceiver 1515 may communicate bi-directionally, via the one or more antennas 1525, wired, or wireless links as described herein. For example, the transceiver 1515 may represent a wireless transceiver and may communicate bi-directionally with another wireless transceiver. The transceiver 1515 may also include a modem to modulate the packets, to provide the modulated packets to one or more antennas 1525 for transmission, and to demodulate packets received from the one or more antennas 1525. The transceiver 1515, or the transceiver 1515 and one or more antennas 1525, may be an example of a transmitter 1215, a transmitter 1315, a receiver 1210, a receiver 1310, or any combination thereof or component thereof, as described herein.

The memory 1530 may include RAM and ROM. The memory 1530 may store computer-readable, computer-executable code 1535 including instructions that, when executed by the processor 1540, cause the device 1505 to perform various functions described herein. The code 1535 may be stored in a non-transitory computer-readable medium such as system memory or another type of memory. In some cases, the code 1535 may not be directly executable by the processor 1540 but may cause a computer (e.g., when compiled and executed) to perform functions described herein. In some cases, the memory 1530 may contain, among other things, a BIOS which may control basic hardware or software operation such as the interaction with peripheral components or devices.

The processor 1540 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some other cases, a memory controller may be integrated into the processor 1540. The processor 1540 may be configured to execute computer-readable instructions stored in a memory (e.g., the memory 1530) to cause the device 1505 to perform various functions (e.g., functions or tasks supporting codebook design and feedback for circular antenna array beamforming). For example, the device 1505 or a component of the device 1505 may include a processor 1540 and memory 1530 coupled to the processor 1540, the processor 1540 and memory 1530 configured to perform various functions described herein.

The inter-station communications manager 1545 may manage communications with other base stations 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communications network technology to provide communication between base stations 105.

The communications manager 1520 may support wireless communication at a base station in accordance with examples as disclosed herein. For example, the communications manager 1520 may be configured as or otherwise support a means for transmitting, to a UE, a message that indicates a codebook type associated with a transmitter circle array of the base station and that indicates a set of multiple parameters associated with the codebook type. The communications manager 1520 may be configured as or otherwise support a means for transmitting, to the UE, a set of multiple reference signals via one or more antenna elements of the transmitter circle array. The communications manager 1520 may be configured as or otherwise support a means for receiving, from the UE, a report indicating one or more codewords associated with the transmitter circle array based on the set of multiple reference signals, the codebook type, and the set of multiple parameters. The communications manager 1520 may be configured as or otherwise support a means for transmitting, to the UE, a downlink data message using one or more transmitter circles of the transmitter circle array based on the report.

By including or configuring the communications manager 1520 in accordance with examples as described herein, the device 1505 may support techniques for more efficient utilization of communication resources and improved coordination between devices, for example via the ability to transmit access beams from the same transmitter circle array of the base station transmitted which may be used for access communications.

In some examples, the communications manager 1520 may be configured to perform various operations (e.g., receiving, monitoring, transmitting) using or otherwise in cooperation with the transceiver 1515, the one or more antennas 1525, or any combination thereof. Although the communications manager 1520 is illustrated as a separate component, in some examples, one or more functions described with reference to the communications manager 1520 may be supported by or performed by the processor 1540, the memory 1530, the code 1535, or any combination thereof. For example, the code 1535 may include instructions executable by the processor 1540 to cause the device 1505 to perform various aspects of codebook design and feedback for circular antenna array beamforming as described herein, or the processor 1540 and the memory 1530 may be otherwise configured to perform or support such operations.

Figure 16:
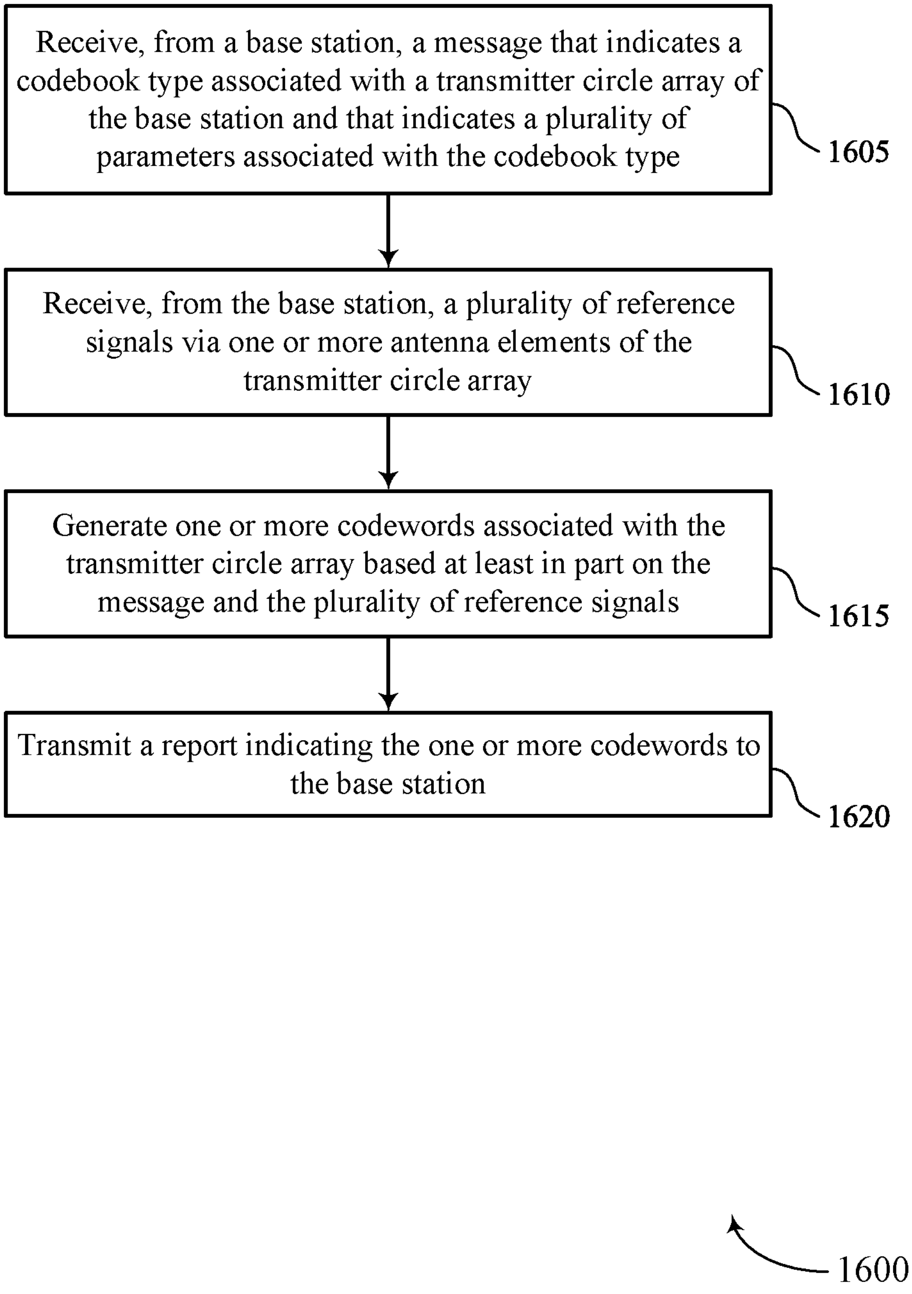
FIGS. 16 through 21 show flowcharts illustrating methods that support codebook design and feedback for circular antenna array beamforming in accordance with aspects of the present disclosure.

FIG. 16 shows a flowchart illustrating a method 1600 that supports codebook design and feedback for circular antenna array beamforming in accordance with aspects of the present disclosure. The operations of the method 1600 may be implemented by a UE or its components as described herein. For example, the operations of the method 1600 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, a message that indicates a codebook type associated with a transmitter circle array of the base station and that indicates a set of multiple parameters associated with the codebook type. The operations of 1605 may be performed in accordance with examples as disclosed herein. In some examples, aspects of the operations of 1605 may be performed by a message receiver 1025 as described with reference to FIG. 10.

At 1610, the method may include receiving, from the base station, a set of multiple reference signals via one or more antenna elements of the transmitter circle array. The operations of 1610 may be performed in accordance with examples as disclosed herein. In some examples, aspects of the operations of 1610 may be performed by a reference signal receiver 1030 as described with reference to FIG. 10.

At 1615, the method may include generating one or more codewords associated with the transmitter circle array based on the message and the set of multiple reference signals. The operations of 1615 may be performed in accordance with examples as disclosed herein. In some examples, aspects of the operations of 1615 may be performed by a codeword generator 1035 as described with reference to FIG. 10.

At 1620, the method may include transmitting a report indicating the one or more codewords to the base station. The operations of 1620 may be performed in accordance with examples as disclosed herein. In some examples, aspects of the operations of 1620 may be performed by a report transmitter 1040 as described with reference to FIG. 10.

Figure 17:
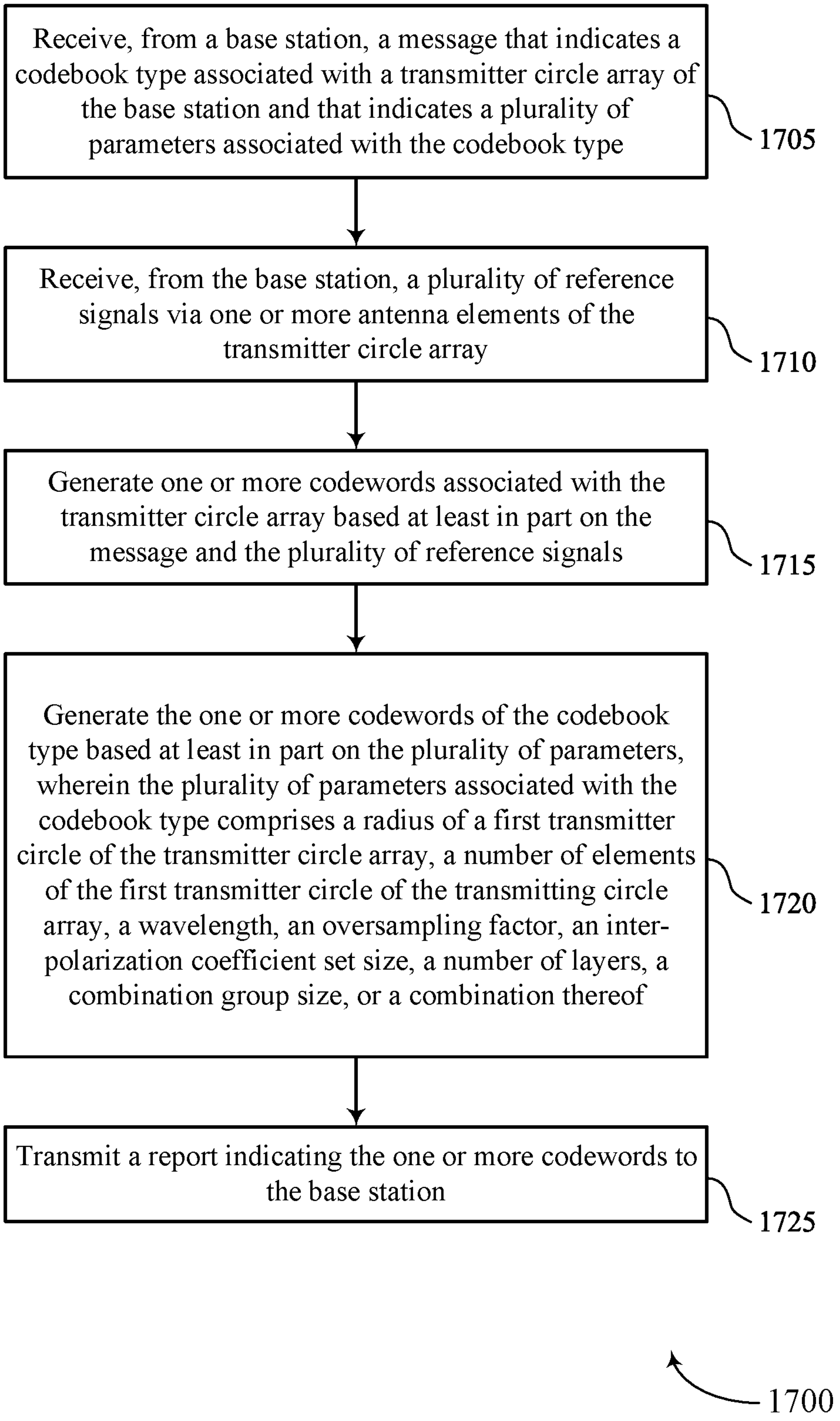

FIG. 17 shows a flowchart illustrating a method 1700 that supports codebook design and feedback for circular antenna array beamforming in accordance with aspects of the present disclosure. The operations of the method 1700 may be implemented by a UE or its components as described herein. For example, the operations of the method 1700 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1705, the method may include receiving, from a base station, a message that indicates a codebook type associated with a transmitter circle array of the base station and that indicates a set of multiple parameters associated with the codebook type. The operations of 1705 may be performed in accordance with examples as disclosed herein. In some examples, aspects of the operations of 1705 may be performed by a message receiver 1025 as described with reference to FIG. 10.

At 1710, the method may include receiving, from the base station, a set of multiple reference signals via one or more antenna elements of the transmitter circle array. The operations of 1710 may be performed in accordance with examples as disclosed herein. In some examples, aspects of the operations of 1710 may be performed by a reference signal receiver 1030 as described with reference to FIG. 10.

At 1715, the method may include generating one or more codewords associated with the transmitter circle array based on the message and the set of multiple reference signals. The operations of 1715 may be performed in accordance with examples as disclosed herein. In some examples, aspects of the operations of 1715 may be performed by a codeword generator 1035 as described with reference to FIG. 10.

At 1720, the method may include generating the one or more codewords of the codebook type based on the set of multiple parameters, where the set of multiple parameters associated with the codebook type includes a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof. The operations of 1720 may be performed in accordance with examples as disclosed herein. In some examples, aspects of the operations of 1720 may be performed by a codeword generator 1035 as described with reference to FIG. 10.

At 1725, the method may include transmitting a report indicating the one or more codewords to the base station. The operations of 1725 may be performed in accordance with examples as disclosed herein. In some examples, aspects of the operations of 1725 may be performed by a report transmitter 1040 as described with reference to FIG. 10.

Figure 18:
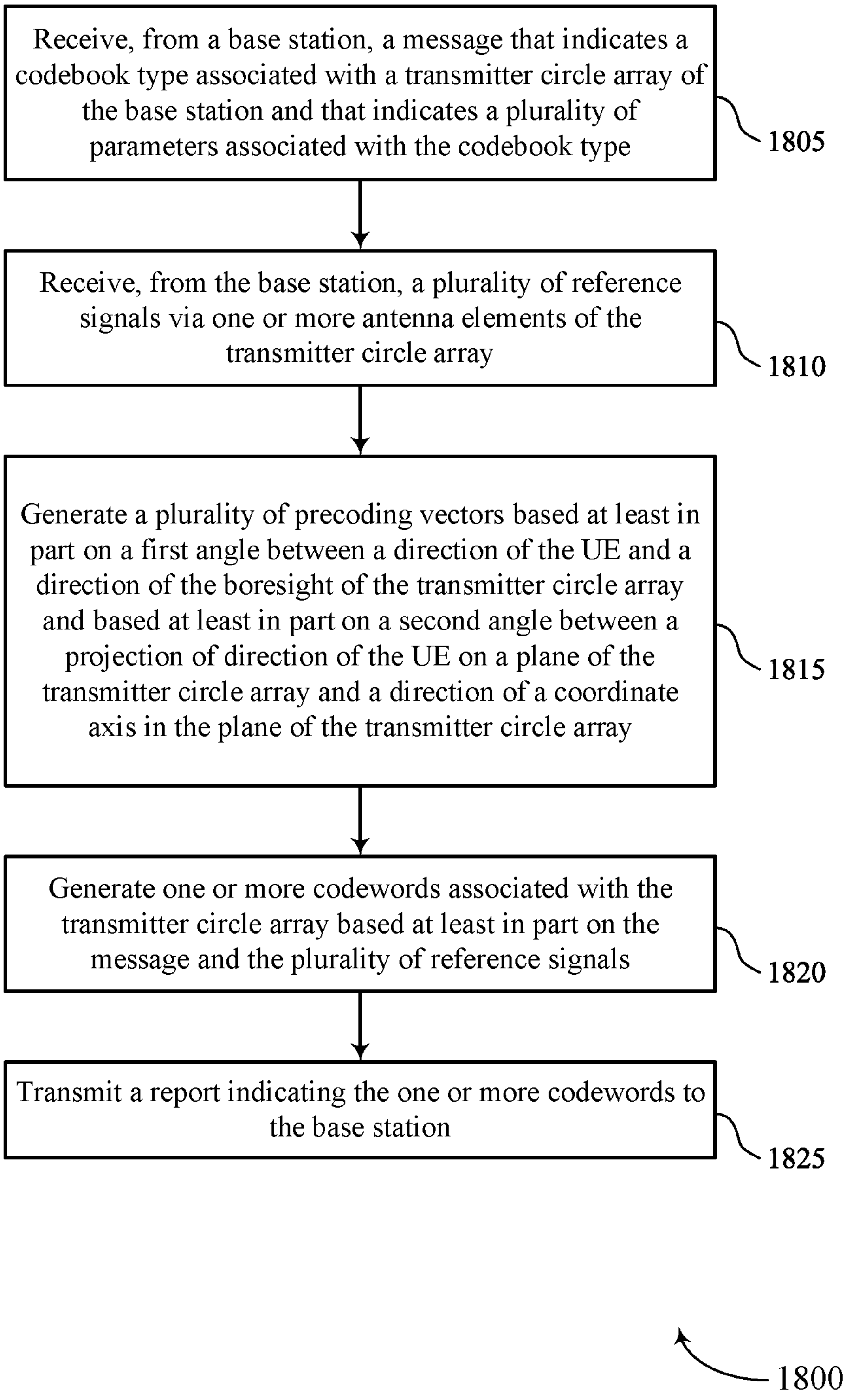

FIG. 18 shows a flowchart illustrating a method 1800 that supports codebook design and feedback for circular antenna array beamforming in accordance with aspects of the present disclosure. The operations of the method 1800 may be implemented by a UE or its components as described herein. For example, the operations of the method 1800 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, a message that indicates a codebook type associated with a transmitter circle array of the base station and that indicates a set of multiple parameters associated with the codebook type. The operations of 1805 may be performed in accordance with examples as disclosed herein. In some examples, aspects of the operations of 1805 may be performed by a message receiver 1025 as described with reference to FIG. 10.

At 1810, the method may include receiving, from the base station, a set of multiple reference signals via one or more antenna elements of the transmitter circle array. The operations of 1810 may be performed in accordance with examples as disclosed herein. In some examples, aspects of the operations of 1810 may be performed by a reference signal receiver 1030 as described with reference to FIG. 10.

At 1815, the method may include generating a set of multiple precoding vectors based on a first angle between a direction of the UE and a direction of the boresight of the transmitter circle array and based on a second angle between a projection of direction of the UE on a plane of the transmitter circle array and a direction of a coordinate axis in the plane of the transmitter circle array. The operations of 1815 may be performed in accordance with examples as disclosed herein. In some examples, aspects of the operations of 1815 may be performed by a vector generator 1045 as described with reference to FIG. 10.

At 1820, the method may include generating one or more codewords associated with the transmitter circle array based on the message and the set of multiple reference signals. The operations of 1820 may be performed in accordance with examples as disclosed herein. In some examples, aspects of the operations of 1820 may be performed by a codeword generator 1035 as described with reference to FIG. 10.

At 1825, the method may include transmitting a report indicating the one or more codewords to the base station. The operations of 1825 may be performed in accordance with examples as disclosed herein. In some examples, aspects of the operations of 1825 may be performed by a report transmitter 1040 as described with reference to FIG. 10.

Figure 19:
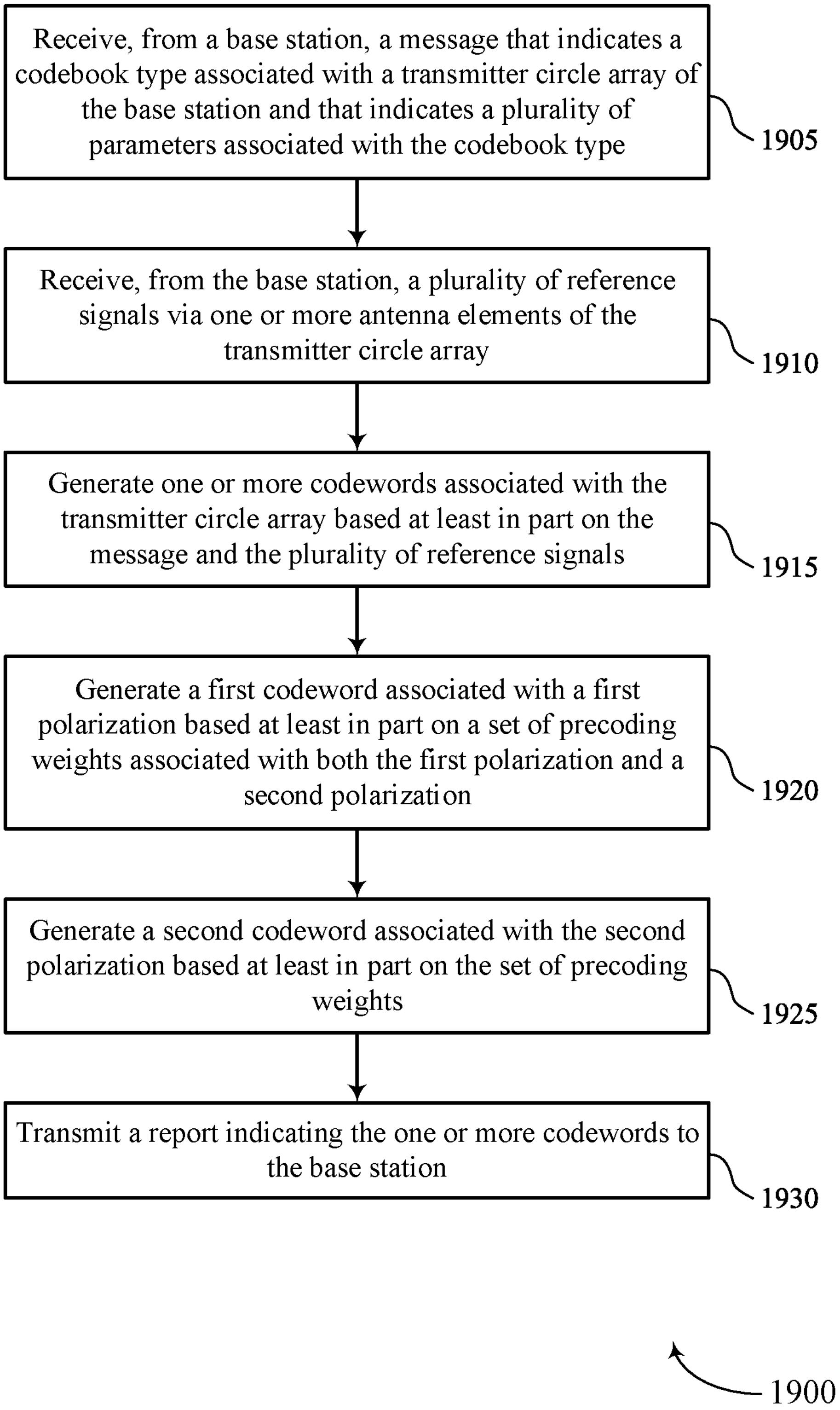

FIG. 19 shows a flowchart illustrating a method 1900 that supports codebook design and feedback for circular antenna array beamforming in accordance with aspects of the present disclosure. The operations of the method 1900 may be implemented by a UE or its components as described herein. For example, the operations of the method 1900 may be performed by a UE 115 as described with reference to FIGS. 1 through 11. In some examples, a UE may execute a set of instructions to control the functional elements of the UE to perform the described functions. Additionally or alternatively, the UE may perform aspects of the described functions using special-purpose hardware.

At 1905, the method may include receiving, from a base station, a message that indicates a codebook type associated with a transmitter circle array of the base station and that indicates a set of multiple parameters associated with the codebook type. The operations of 1905 may be performed in accordance with examples as disclosed herein. In some examples, aspects of the operations of 1905 may be performed by a message receiver 1025 as described with reference to FIG. 10.

At 1910, the method may include receiving, from the base station, a set of multiple reference signals via one or more antenna elements of the transmitter circle array. The operations of 1910 may be performed in accordance with examples as disclosed herein. In some examples, aspects of the operations of 1910 may be performed by a reference signal receiver 1030 as described with reference to FIG. 10.

At 1915, the method may include generating one or more codewords associated with the transmitter circle array based on the message and the set of multiple reference signals. The operations of 1915 may be performed in accordance with examples as disclosed herein. In some examples, aspects of the operations of 1915 may be performed by a codeword generator 1035 as described with reference to FIG. 10.

At 1920, the method may include generating a first codeword associated with a first polarization based on a set of precoding weights associated with both the first polarization and a second polarization. The operations of 1920 may be performed in accordance with examples as disclosed herein. In some examples, aspects of the operations of 1920 may be performed by a codeword generator 1035 as described with reference to FIG. 10.

At 1925, the method may include generating a second codeword associated with the second polarization based on the set of precoding weights. The operations of 1925 may be performed in accordance with examples as disclosed herein. In some examples, aspects of the operations of 1925 may be performed by a codeword generator 1035 as described with reference to FIG. 10.

At 1930, the method may include transmitting a report indicating the one or more codewords to the base station. The operations of 1930 may be performed in accordance with examples as disclosed herein. In some examples, aspects of the operations of 1930 may be performed by a report transmitter 1040 as described with reference to FIG. 10.

Figure 20:
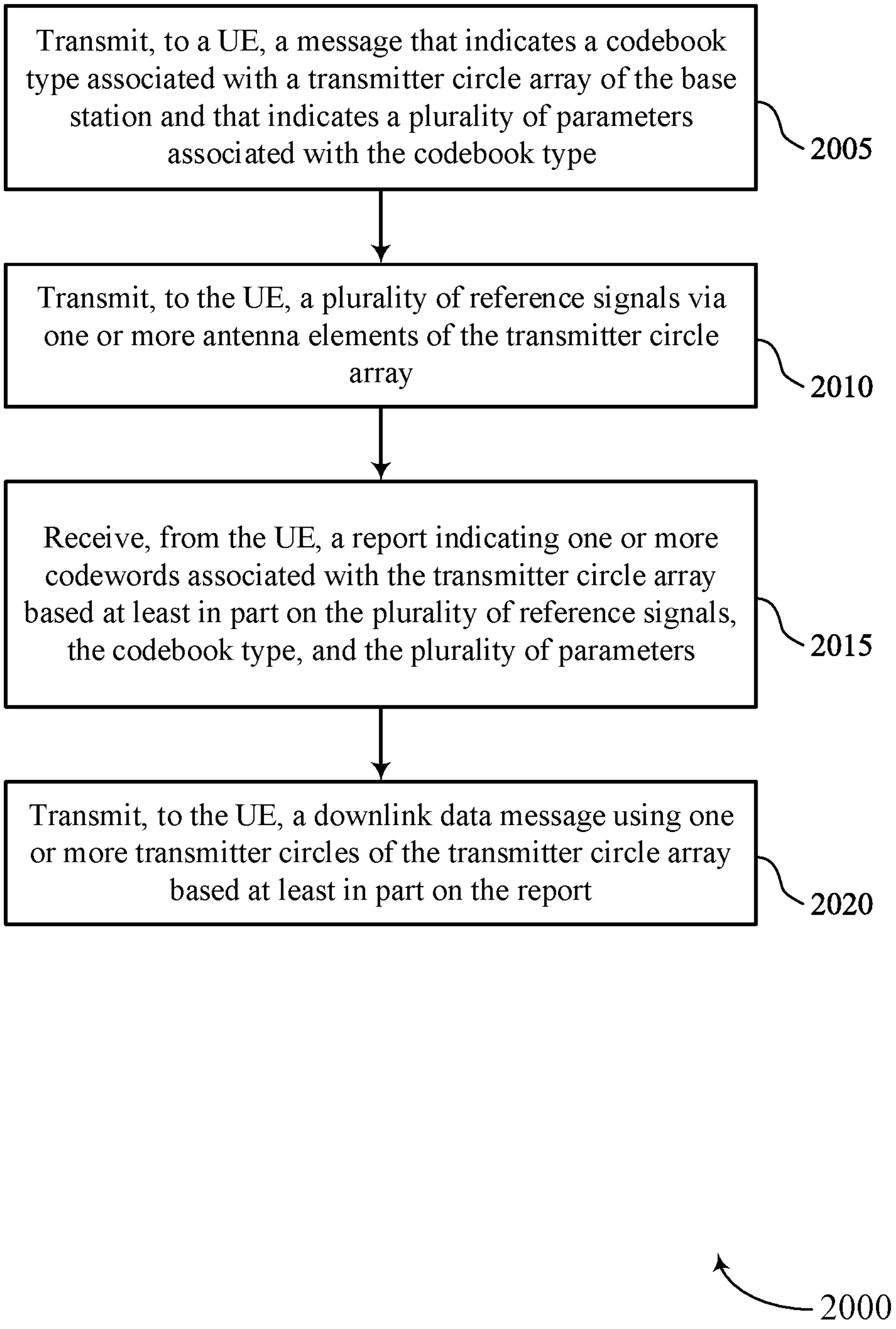

FIG. 20 shows a flowchart illustrating a method 2000 that supports codebook design and feedback for circular antenna array beamforming in accordance with aspects of the present disclosure. The operations of the method 2000 may be implemented by a base station or its components as described herein. For example, the operations of the method 2000 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, a message that indicates a codebook type associated with a transmitter circle array of the base station and that indicates a set of multiple parameters associated with the codebook type. The operations of 2005 may be performed in accordance with examples as disclosed herein. In some examples, aspects of the operations of 2005 may be performed by a codebook manager 1425 as described with reference to FIG. 14.

At 2010, the method may include transmitting, to the UE, a set of multiple reference signals via one or more antenna elements of the transmitter circle array. The operations of 2010 may be performed in accordance with examples as disclosed herein. In some examples, aspects of the operations of 2010 may be performed by a reference signal transmitter 1430 as described with reference to FIG. 14.

At 2015, the method may include receiving, from the UE, a report indicating one or more codewords associated with the transmitter circle array based on the set of multiple reference signals, the codebook type, and the set of multiple parameters. The operations of 2015 may be performed in accordance with examples as disclosed herein. In some examples, aspects of the operations of 2015 may be performed by a report receiver 1435 as described with reference to FIG. 14.

At 2020, the method may include transmitting, to the UE, a downlink data message using one or more transmitter circles of the transmitter circle array based on the report. The operations of 2020 may be performed in accordance with examples as disclosed herein. In some examples, aspects of the operations of 2020 may be performed by a downlink message transmitter 1440 as described with reference to FIG. 14.

Figure 21:
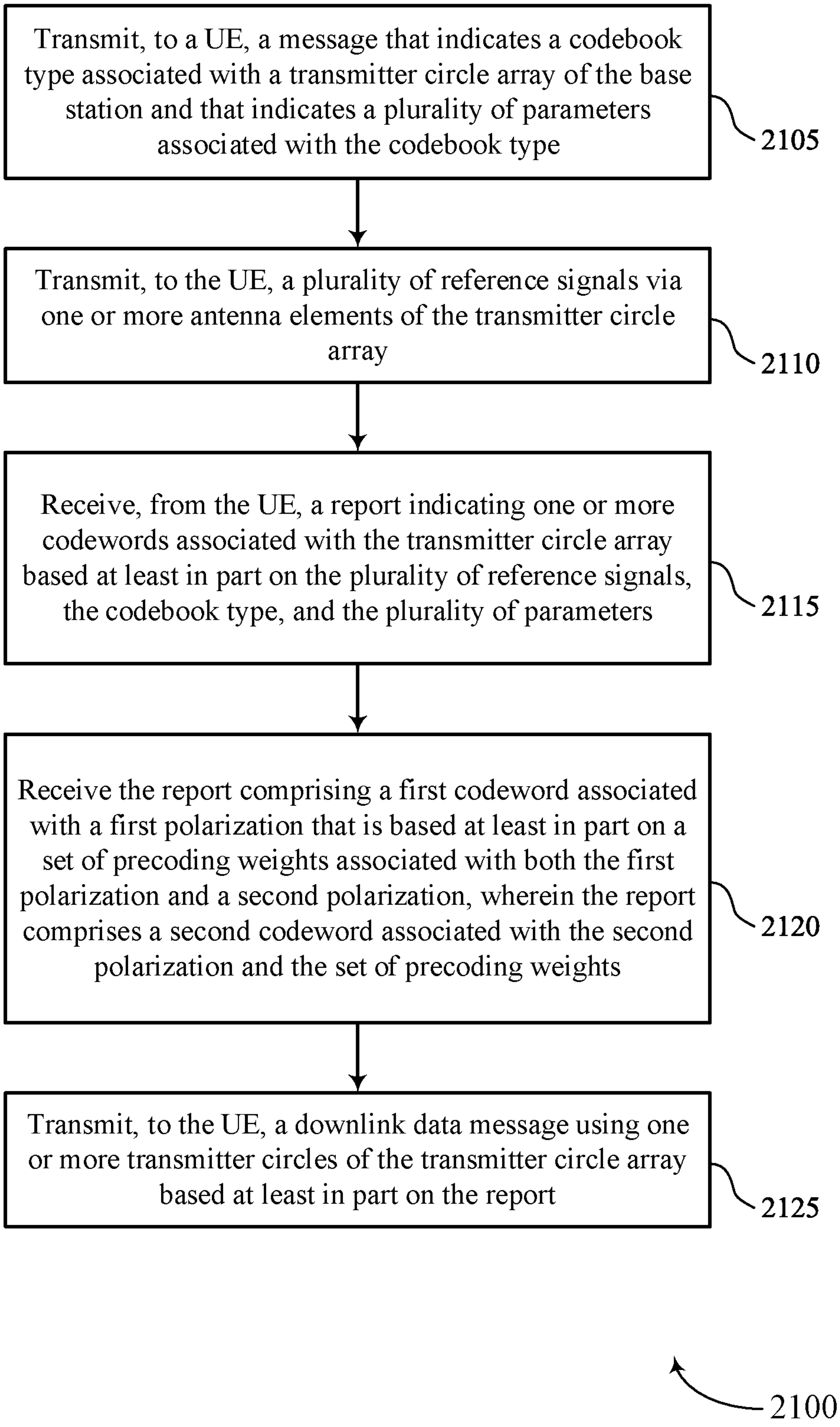

FIG. 21 shows a flowchart illustrating a method 2100 that supports codebook design and feedback for circular antenna array beamforming in accordance with aspects of the present disclosure. The operations of the method 2100 may be implemented by a base station or its components as described herein. For example, the operations of the method 2100 may be performed by a base station 105 as described with reference to FIGS. 1 through 7 and 12 through 15. In some examples, a base station may execute a set of instructions to control the functional elements of the base station to perform the described functions. Additionally or alternatively, the base station may perform aspects of the described functions using special-purpose hardware.

At 2105, the method may include transmitting, to a UE, a message that indicates a codebook type associated with a transmitter circle array of the base station and that indicates a set of multiple parameters associated with the codebook type. The operations of 2105 may be performed in accordance with examples as disclosed herein. In some examples, aspects of the operations of 2105 may be performed by a codebook manager 1425 as described with reference to FIG. 14.

At 2110, the method may include transmitting, to the UE, a set of multiple reference signals via one or more antenna elements of the transmitter circle array. The operations of 2110 may be performed in accordance with examples as disclosed herein. In some examples, aspects of the operations of 2110 may be performed by a reference signal transmitter 1430 as described with reference to FIG. 14.

At 2115, the method may include receiving, from the UE, a report indicating one or more codewords associated with the transmitter circle array based on the set of multiple reference signals, the codebook type, and the set of multiple parameters. The operations of 2115 may be performed in accordance with examples as disclosed herein. In some examples, aspects of the operations of 2115 may be performed by a report receiver 1435 as described with reference to FIG. 14.

At 2120, the method may include receiving the report including a first codeword associated with a first polarization that is based on a set of precoding weights associated with both the first polarization and a second polarization, where the report includes a second codeword associated with the second polarization and the set of precoding weights. The operations of 2120 may be performed in accordance with examples as disclosed herein. In some examples, aspects of the operations of 2120 may be performed by a report receiver 1435 as described with reference to FIG. 14.

At 2125, the method may include transmitting, to the UE, a downlink data message using one or more transmitter circles of the transmitter circle array based on the report. The operations of 2125 may be performed in accordance with examples as disclosed herein. In some examples, aspects of the operations of 2125 may be performed by a downlink message transmitter 1440 as described with reference to FIG. 14.

The following provides an overview of aspects of the present disclosure:

Aspect 1: A method for wireless communications at a UE, comprising: receiving, from a base station, a message that indicates a codebook type associated with a transmitter circle array of the base station and that indicates a plurality of parameters associated with the codebook type; receiving, from the base station, a plurality of reference signals via one or more antenna elements of the transmitter circle array; generating one or more codewords associated with the transmitter circle array based at least in part on the message and the plurality of reference signals; and transmitting a report indicating the one or more codewords to the base station.

Aspect 2: The method of aspect 1, wherein generating the one or more codewords comprises: generating the one or more codewords of the codebook type based at least in part on the plurality of parameters, wherein the plurality of parameters associated with the codebook type comprises a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

Aspect 3: The method of any of aspects 1 through 2, wherein generating the one or more codewords comprises: generating a plurality of precoding vectors based at least in part on a first angle between a direction of the UE and a direction of the boresight of the transmitter circle array and based at least in part on a second angle between a projection of direction of the UE on a plane of the transmitter circle array and a direction of a coordinate axis in the plane of the transmitter circle array.

Aspect 4: The method of any of aspects 1 through 3, wherein generating the one or more codewords comprises: generating a first codeword associated with a first polarization based at least in part on a set of precoding weights associated with both the first polarization and a second polarization; and generating a second codeword associated with the second polarization based at least in part on the set of precoding weights.

Aspect 5: The method of any of aspects 1 through 4, wherein the codebook type is a multi-layer codebook and the plurality of parameters comprises a number of layers, wherein generating the one or more codewords comprises: generating a set of precoding vectors based at least in part on the number of layers, wherein the set of precoding vectors comprises precoding vectors that are independent of each other.

Aspect 6: The method of any of aspects 1 through 5, wherein the codebook type is a multi-layer codebook and the plurality of parameters comprises a number of layers, wherein generating the one or more codewords comprises: generating a set of precoding vectors based at least in part on the number of layers, wherein the set of precoding vectors comprises at least one precoding vector that is dependent on another precoding vector of the set of precoding vectors.

Aspect 7: The method of any of aspects 1 through 6, wherein generating the one or more codewords comprises: generating a first codeword associated with a first layer and a first polarization; and generating a second codeword associated with a second layer and a second polarization.

Aspect 8: The method of aspect 7, wherein the first layer, the second layer, the first polarization, and the second polarization are associated with common basis direction vectors.

Aspect 9: The method of any of aspects 7 through 8, wherein the first and second layers are associated with common basis direction vectors; and the first and second polarizations are associated with different basis direction vectors.

Aspect 10: The method of any of aspects 7 through 9, wherein the first and second layers are associated with different basis direction vectors; and the first and second polarizations are associated with common basis direction vectors.

Aspect 11: The method of any of aspects 7 through 10, wherein the first layer, the second layer, the first polarization, and the second polarization are associated with different basis direction vectors.

Aspect 12: The method of any of aspects 1 through 11, wherein a codeword of the one or more codewords is associated with a weighted sum of basis direction vectors used for generating the codeword.

Aspect 13: The method of any of aspects 1 through 12, further comprising: generating the report comprising a first set of codewords associated with a wideband channel.

Aspect 14: The method of any of aspects 1 through 13, further comprising: generating the report comprising a first set of codewords associated with a first subband and a second set of codewords associated with a second subband.

Aspect 15: The method of any of aspects 1 through 14, wherein generating the one or more codewords comprises: generating respective sets of one or more codewords for each transmitter circle of the transmitter circle array.

Aspect 16: The method of any of aspects 1 through 15, wherein the report comprises a set of quantization bits indicative of a precoding matrix indicator associated with the one or more codewords.

Aspect 17: A method for wireless communication at a base station, comprising: transmitting, to a UE, a message that indicates a codebook type associated with a transmitter circle array of the base station and that indicates a plurality of parameters associated with the codebook type; transmitting, to the UE, a plurality of reference signals via one or more antenna elements of the transmitter circle array; receiving, from the UE, a report indicating one or more codewords associated with the transmitter circle array based at least in part on the plurality of reference signals, the codebook type, and the plurality of parameters; and transmitting, to the UE, a downlink data message using one or more transmitter circles of the transmitter circle array based at least in part on the report.

Aspect 18: The method of aspect 17, wherein the plurality of parameters associated with the codebook type comprises a radius of a first transmitter circle of the transmitter circle array, a number of elements of the first transmitter circle of the transmitting circle array, a wavelength, an oversampling factor, an inter-polarization coefficient set size, a number of layers, a combination group size, or a combination thereof.

Aspect 19: The method of any of aspects 17 through 18, wherein the one or more codewords are associated with a plurality of precoding vectors, the plurality of precoding vectors based at least in part on a first angle between a direction of the UE and a direction of the boresight of the transmitter circle array and based at least in part on a second angle between a projection of direction of the UE on a plane of the transmitter circle array and a direction of a coordinate axis in the plane of the transmitter circle array.

Aspect 20: The method of any of aspects 17 through 19, wherein receiving the report comprises: receiving the report comprising a first codeword associated with a first polarization that is based at least in part on a set of precoding weights associated with both the first polarization and a second polarization, wherein the report comprises a second codeword associated with the second polarization and the set of precoding weights.

Aspect 21: The method of any of aspects 17 through 20, wherein the codebook type is a multi-layer codebook and the plurality of parameters comprises a number of layers; and the one or more codewords are based at least in part on a set of precoding vectors and the number of layers, wherein the set of precoding vectors comprises precoding vectors that are independent of each other.

Aspect 22: The method of aspect 21, wherein a codeword of the one or more codewords is associated with a weighted sum of the basis direction vectors.

Aspect 23: The method of any of aspects 17 through 22, wherein the report indicates a first codeword associated with a first layer and a first polarization; and the report indicates a second codeword associated with a second layer and a second polarization.

Aspect 24: The method of aspect 23, wherein the first layer, the second layer, the first polarization, and the second polarization are associated with common basis direction vectors.

Aspect 25: The method of any of aspects 23 through 24, wherein the first and second layers are associated with common basis direction vectors; and the first and second polarizations are associated with different basis direction vectors.

Aspect 26: The method of any of aspects 23 through 25, wherein the first and second layers are associated with different basis direction vectors; and the first and second polarizations are associated with common basis direction vectors.

Aspect 27: The method of any of aspects 23 through 26, wherein the first layer, the second layer, the first polarization, and the second polarization are associated with different basis direction vectors.

Aspect 28: The method of any of aspects 17 through 27, wherein the report comprises a first set of codewords associated with a wideband channel.

Aspect 29: The method of any of aspects 17 through 28, wherein the report comprises a first set of codewords associated with a first subband and a second set of codewords associated with a second subband.

Aspect 30: The method of any of aspects 17 through 29, wherein the report comprises respective sets of one or more codewords for each transmitter circle of the transmitter circle array based at least in part on the plurality of reference signals.

Aspect 31: The method of any of aspects 17 through 30, wherein the report comprises a set of quantization bits indicative of a precoding matrix indicator associated with the one or more codewords.

Aspect 32: An apparatus for wireless communications at a UE, comprising a processor; memory coupled with the processor; and instructions stored in the memory and executable by the processor to cause the apparatus to perform a method of any of aspects 1 through 16.

Aspect 33: An apparatus for wireless communications at a UE, comprising at least one means for performing a method of any of aspects 1 through 16.

Aspect 34: A non-transitory computer-readable medium storing code for wireless communications at a UE, the code comprising instructions executable by a processor to perform a method of any of aspects 1 through 16.

Aspect 35: An apparatus for wireless communication at a base station, comprising a processor; memory coupled with the processor; and instructions stored in the memory and executable by the processor to cause the apparatus to perform a method of any of aspects 17 through 31.

Aspect 36: An apparatus for wireless communication at a base station, comprising at least one means for performing a method of any of aspects 17 through 31.

Aspect 37: A non-transitory computer-readable medium storing code for wireless communication at a base station, the code comprising instructions executable by a processor to perform a method of any of aspects 17 through 31.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive, from a network device, a message that indicates a codebook type associated with a transmitter circle array of the network device and that indicates a plurality of parameters associated with the codebook type, the plurality of parameters comprising a radius of a first transmitter circle of the transmitter circle array, and wherein the codebook type indicates whether the plurality of parameters further comprises a combination group size;

receive, from the network device, a plurality of reference signals via one or more antenna elements of the transmitter circle array;

generate one or more codewords associated with the transmitter circle array based at least in part on the message and the plurality of reference signals; and transmit a report indicating the one or more codewords to the network device.

2. The UE of claim 1, wherein, to generate the one or more codewords, the one or more processors are individually or collectively further operable to execute the code to cause the UE to:

generate the one or more codewords of the codebook type based at least in part on the plurality of parameters, wherein the plurality of parameters associated with the codebook type further comprises a number of elements of the first transmitter circle of the transmitter circle array, a wavelength, an oversampling factor, an inter-polarization coefficient set size, a number of layers, the combination group size, or a combination thereof.

3. The UE of claim 1, wherein, to generate the one or more codewords, the one or more processors are individually or collectively further operable to execute the code to cause the UE to:

generate a plurality of precoding vectors based at least in part on a first angle between a direction of the UE and a direction of the boresight of the transmitter circle array and based at least in part on a second angle between a projection of direction of the UE on a plane of the transmitter circle array and a direction of a coordinate axis in the plane of the transmitter circle array.

4. The UE of claim 1, wherein, to generate the one or more codewords, the one or more processors are individually or collectively further operable to execute the code to cause the UE to:

generate a first codeword associated with a first polarization based at least in part on a set of precoding weights associated with both the first polarization and a second polarization; and generate a second codeword associated with the second polarization based at least in part on the set of precoding weights.

5. The UE of claim 1, wherein the codebook type is a multi-layer codebook and the plurality of parameters comprises a number of layers, wherein, to generate the one or more codewords, the one or more processors are individually or collectively further operable to execute the code to cause the UE to:

generate a set of precoding vectors based at least in part on the number of layers, wherein either the set of precoding vectors comprises precoding vectors that are independent of each other or the set of precoding vectors comprises at least one precoding vector that is dependent on another precoding vector of the set of precoding vectors.

6. The UE of claim 1, wherein, to generate the one or more codewords, the one or more processors are individually or collectively further operable to execute the code to cause the UE to:

generate a first codeword associated with a first layer and a first polarization; and generate a second codeword associated with a second layer and a second polarization.

7. The UE of claim 6, wherein the first layer, the second layer, the first polarization, and the second polarization are associated with either common basis direction vectors or different basis direction vectors.

8. The UE of claim 6, wherein:

the first and second layers are associated with either common basis direction vectors or different basis direction vectors; and the first and second polarizations are associated with either the different basis direction vectors or the common basis direction vectors.

9. The UE of claim 1, wherein a codeword of the one or more codewords is associated with a weighted sum of basis direction vectors used for generating the codeword.

10. The UE of claim 1, wherein the one or more processors are individually or collectively further operable to execute the code to cause the UE to:

generate the report comprising a first set of codewords associated either with a wideband channel or a first subband and a second set of codewords associated with a second subband.

11. The UE of claim 1, wherein, to generate the one or more codewords, the one or more processors are individually or collectively further operable to execute the code to cause the UE to:

generate respective sets of one or more codewords for each transmitter circle of the transmitter circle array.

12. The UE of claim 1, wherein the report comprises a set of quantization bits indicative of a precoding matrix indicator associated with the one or more codewords.

13. A network device, comprising:

one or more memories storing processor-executable code; and one or more processors coupled with the one or more memories and individually or collectively operable to execute the code to cause the network device to:

transmit, to a user equipment (UE), a message that indicates a codebook type associated with a transmitter circle array of the network device and that indicates a plurality of parameters associated with the codebook type, the plurality of parameters comprising a radius of a first transmitter circle of the transmitter circle array, and wherein the codebook type indicates whether the plurality of parameters further comprises a combination group size;

transmit, to the UE, a plurality of reference signals via one or more antenna elements of the transmitter circle array;

receive, from the UE, a report indicating one or more codewords associated with the transmitter circle array based at least in part on the plurality of reference signals, the codebook type, and the plurality of parameters; and transmit, to the UE, a downlink data message using one or more transmitter circles of the transmitter circle array based at least in part on the report.

14. The network device of claim 13, wherein the plurality of parameters associated with the codebook type further comprises a number of elements of the first transmitter circle of the transmitter circle array, a wavelength, an oversampling factor, an inter-polarization coefficient set size, a number of layers, the combination group size, or a combination thereof.

15. The network device of claim 13, wherein the one or more codewords are associated with a plurality of precoding vectors, the plurality of precoding vectors based at least in part on a first angle between a direction of the UE and a direction of the boresight of the transmitter circle array and based at least in part on a second angle between a projection of direction of the UE on a plane of the transmitter circle array and a direction of a coordinate axis in the plane of the transmitter circle array.

16. The network device of claim 13, wherein, to receive the report, the one or more processors are individually or collectively further operable to execute the code to cause the network device to:

receive the report comprising a first codeword associated with a first polarization that is based at least in part on a set of precoding weights associated with both the first polarization and a second polarization, wherein the report comprises a second codeword associated with the second polarization and the set of precoding weights.

17. The network device of claim 13, wherein:

the codebook type is a multi-layer codebook and the plurality of parameters comprises a number of layers; and the one or more codewords are based at least in part on a set of precoding vectors and the number of layers, wherein the set of precoding vectors comprises precoding vectors that are independent of each other.

18. The network device of claim 13, wherein:

the report indicates a first codeword associated with a first layer and a first polarization; and the report indicates a second codeword associated with a second layer and a second polarization.

19. The network device of claim 13, wherein the report comprises a first set of codewords associated with either a wideband channel or a first subband and a second set of codewords associated with a second subband.

20. A method for wireless communications at a user equipment (UE), comprising:

receiving, from a network device, a message that indicates a codebook type associated with a transmitter circle array of the network device and that indicates a plurality of parameters associated with the codebook type, the plurality of parameters comprising a radius of a first transmitter circle of the transmitter circle array, and wherein the codebook type indicates whether the plurality of parameters further comprises a combination group size;

receiving, from the network device, a plurality of reference signals via one or more antenna elements of the transmitter circle array;

generating one or more codewords associated with the transmitter circle array based at least in part on the message and the plurality of reference signals; and transmitting a report indicating the one or more codewords to the network device.

* * * * *